United States Patent
Pan

(10) Patent No.: US 10,962,655 B2
(45) Date of Patent: Mar. 30, 2021

(54) SYSTEMS AND METHODS FOR POSITIONING OF UAV

(71) Applicant: SZ DJI TECHNOLOGY CO., LTD., Shenzhen (CN)

(72) Inventor: Guoxiu Pan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 355 days.

(21) Appl. No.: 15/923,200

(22) Filed: Mar. 16, 2018

(65) Prior Publication Data

US 2018/0284293 A1 Oct. 4, 2018

Related U.S. Application Data

(63) Continuation of application No. PCT/CN2015/089689, filed on Sep. 16, 2015.

(51) Int. Cl.
*G01S 19/51* (2010.01)
*G01S 19/41* (2010.01)
(Continued)

(52) U.S. Cl.
CPC ............. *G01S 19/51* (2013.01); *G01S 19/41* (2013.01); *G01S 19/43* (2013.01); *G01S 19/45* (2013.01); *G01S 19/48* (2013.01)

(58) Field of Classification Search
CPC .......... G01S 19/44; G01S 19/43; G01S 19/51; G01S 19/071; G01S 19/073; G01S 19/45; G01S 19/48; G05D 1/0278
See application file for complete search history.

(56) References Cited

U.S. PATENT DOCUMENTS 6,061,632 A * 5/2000 Dreier ................... G01S 19/41
701/470
6,414,629 B1 7/2002 Curcio et al.
(Continued)

FOREIGN PATENT DOCUMENTS

CN 1288518 A 3/2001
CN 101151188 A 3/2008
(Continued)

OTHER PUBLICATIONS

English translation of JP-10002743-A (Year: 2020).*
(Continued)

*Primary Examiner* — Bernarr E Gregory
*Assistant Examiner* — Fred H Mull
(74) *Attorney, Agent, or Firm* — Anova Law Group, PLLC

(57) ABSTRACT

A positioning system includes a base station and a tracking device. The base station is configured to receive an estimated location of the base station at a receiver coupled to the base station and determine a correction measurement based on the estimated location of the base station and a known location of the base station. The tracking device is configured to obtain an estimated location of a target object, receive an estimated location of the tracking device at a receiver coupled to the tracking device, determine a relative position between the target object and the tracking device based on the estimated location of the target object, the estimated location of the tracking device, and the correction measurement, and control a movement of the tracking device according to the relative position.

20 Claims, 28 Drawing Sheets

(51) Int. Cl.
*G01S 19/43* (2010.01)
*G01S 19/45* (2010.01)
*G01S 19/48* (2010.01)

(56) References Cited

U.S. PATENT DOCUMENTS

| | | | |
|---|---|---|---|
| 6,449,558 B1 * | 9/2002 | Small | G01S 19/071 |
| | | | 701/470 |
| 10,187,580 B1 * | 1/2019 | Beard | G06K 9/0063 |
| 2002/0032525 A1 | 3/2002 | Yoshikawa et al. | |
| 2005/0035242 A1 * | 2/2005 | Nugent | B64D 31/06 |
| | | | 244/175 |
| 2006/0114324 A1 * | 6/2006 | Farmer | H04B 7/18506 |
| | | | 348/144 |
| 2007/0085734 A1 * | 4/2007 | Whitehead | G01S 19/07 |
| | | | 342/357.24 |
| 2008/0114544 A1 | 5/2008 | Liu et al. | |
| 2009/0069957 A1 * | 3/2009 | Nakamura | G05D 1/0094 |
| | | | 701/3 |
| 2010/0049376 A1 | 2/2010 | Schultz | |
| 2013/0116908 A1 | 5/2013 | Oh et al. | |
| 2013/0293412 A1 * | 11/2013 | Appleford | G01S 19/41 |
| | | | 342/357.23 |
| 2014/0210663 A1 | 7/2014 | Metzler | |
| 2015/0185331 A1 * | 7/2015 | Dai | G01S 19/04 |
| | | | 342/357.27 |

FOREIGN PATENT DOCUMENTS

| | | | |
|---|---|---|---|
| CN | 102016625 A | | 4/2011 |
| CN | 103096247 A | | 5/2013 |
| CN | 103149939 A | | 6/2013 |
| CN | 103299205 A | | 9/2013 |
| JP | H0961509 A | | 3/1997 |
| JP | H0961511 A | | 3/1997 |
| JP | H09061512 A | | 3/1997 |
| JP | 10002743 A | * | 1/1998 |
| JP | H102743 A | | 1/1998 |
| JP | 2001283400 A | | 10/2001 |
| JP | 2001343213 A | | 12/2001 |
| JP | 2001359083 A | | 12/2001 |
| JP | 2002068091 A | | 3/2002 |
| JP | 2003219448 A | | 7/2003 |
| JP | 2004008186 A | | 1/2004 |
| JP | 2004112615 A | | 4/2004 |
| JP | 2007240309 A | | 9/2007 |
| JP | 2009177666 A | | 8/2009 |
| JP | 2009264844 A | | 11/2009 |
| JP | 2012232654 A | | 11/2012 |
| JP | 2013101100 A | | 5/2013 |
| JP | 2013148524 A | | 8/2013 |
| WO | 2006104158 A1 | | 10/2006 |

OTHER PUBLICATIONS

The World Intellectual Property Organization (WIPO) International Search Report and Written Opinion for PCT/CN2015/089689 dated Jun. 13, 2016 9 Pages.

W. Stempfhuber and M. Buchholz, A Precise, Low-Cost Rtk Gnss System for UAV Applications, International Archives of the Photogrammetry, Remote Sensing and Spatial Information Sciences, Sep. 2011, pp. 289-293, Zurich, Switzerland.

* cited by examiner

SYSTEMS AND METHODS FOR POSITIONING OF UAV

CROSS-REFERENCE TO RELATED APPLICATION

This application is a continuation application of International Application No. PCT/CN2015/089689, filed on Sep. 16, 2015, the entire contents of which are incorporated herein by reference.

BACKGROUND

Aerial vehicles, such as unmanned aerial vehicles (UAVs), can be used for performing surveillance, reconnaissance, and exploration tasks for military and civilian applications. Such aerial vehicles may carry a payload configured to perform a specific function.

An aerial vehicle can be used to track a target. Conventional tracking methods may be based on global positioning system (GPS) data or camera vision. However, the accuracy of conventional GPS-based or vision-based tracking methods may be limited. For example, the location accuracy/precision of a typical GPS receiver may range from about 2 meters to 4 meters, which is inadequate for tracking at a higher degree of precision. The accuracy of vision-based tracking may be affected by optical factors such as illumination intensity. This limited tracking accuracy may reduce the usefulness of aerial vehicles in particular applications.

SUMMARY

A need exists to improve the tracking accuracy and/or precise positioning of an aerial vehicle, such as an unmanned aerial vehicle (UAV). The improved tracking accuracy may allow an aerial vehicle to track a target at a centimeter or sub-centimeter level. The improved tracking accuracy may be particularly useful when the aerial vehicle is used to precisely track a small and fast-moving target, deliver items, or patrol or scan a defined area.

In a conventional global positioning system (GPS)-based tracking method, estimates of the real-time position and velocity of the UAV and the target object may be obtained from GPS receivers respectively located on the UAV and the target object. The UAV can track the target object based on the estimated positions and velocities obtained from GPS signals. However, the tracking accuracy in conventional GPS-based tracking methods may be limited, given that the location accuracy of a typical GPS receiver ranges from about 2 meters to about 4 meters.

In some instances, an aerial vehicle and a target object may be moving concurrently. However, their estimated positions and velocities from GPS signals may not be updated at a sufficient frequency in real-time, that allows for high precision tracking (e.g., at a centimeter level). For example, there may be a time delay or a lack of correlation between the estimated positions and velocities of the UAV and the target object. This may compound the inherent GPS positioning errors (2-4 m) of the UAV and target object, and result in a further decrease in tracking accuracy.

In vision-based tracking methods, the target object may be tracked using a camera located on the UAV, which usually requires a clear line of sight between the camera and target object. As such, the viability of vision-based tracking may be affected by objects obscuring the line of sight between the camera and target object. Such objects may include other aerial vehicles, buildings, natural terrain features such as foliage, mountains, etc.

Accordingly, a need exists to improve the tracking accuracy and tracking robustness of an aerial vehicle under different conditions for a variety of applications requiring high accuracy/precision. The conditions may include different movement characteristics (e.g., velocity and acceleration, direction, altitude, attitude, ascent/descent, pitch/yaw/roll of the vehicle or the target object), different weather conditions (e.g., clouds, rain, snow, etc.), and/or different types of terrain features (e.g., buildings, foliage, hills, valleys, water bodies, etc.). The applications may include precise tracking of a target object, aerial maneuvers, item delivery, and/or patrolling or scanning of a defined area. Systems, methods, and devices are provided herein to address at least the above needs.

For instance, in some aspects of the disclosure, a method for positioning at least one mobile tracking device relative to at least one target object is provided. The method may comprise: obtaining an estimated location of the target object; and determining a relative position between the target object and the mobile tracking device based on: (1) the estimated location of the target object, (2) an estimated location of the mobile tracking device, and (3) a correction measurement.

According to an aspect of the disclosure, an apparatus for positioning at least one mobile tracking device relative to at least one target object is provided. The apparatus may comprise one or more processors that are, individually or collectively, configured to: obtain an estimated location of the target object; and determine a relative position between the target object and the mobile tracking device based on: (1) the estimated location of the target object, (2) an estimated location of the mobile tracking device, and (3) a correction measurement.

According to another aspect of the disclosure, a non-transitory computer-readable medium storing instructions that, when executed, causes a computer to perform a method for positioning at least one mobile tracking device relative to at least one target object, is provided. The method may comprise: obtaining an estimated location of the target object; and determining a relative position between the target object and the mobile tracking device based on: (1) the estimated location of the target object, (2) an estimated location of the mobile tracking device, and (3) a correction measurement.

A mobile tracking system may be provided in accordance with an additional aspect of the disclosure. The system may comprise: a mobile tracking device; and one or more processors that are, individually or collectively, configured to determine a relative position between a target object and the mobile tracking device based on: (1) an estimated location of the target object, (2) an estimated location of the mobile tracking device, and (3) a correction measurement.

Further aspects of the disclosure may be directed to an apparatus for positioning at least one tracking device relative to at least one target object. The apparatus may comprise one or more processors that are, individually or collectively, configured to: obtain a corrected location of the target object based on (1) an estimated location of the target object received at a receiver on the target object and (2) a correction measurement; obtain a corrected location of the tracking device based on (1) an estimated location of the tracking device received at a receiver on the tracking device and (2) the correction measurement; and determine a position of at least one of the tracking device or the target object based on the corrected location of the target object and the corrected location of the tracking device, such that the tracking device and the target object are positioned relative to each other to achieve a positional goal.

According to an aspect of the disclosure, a method for positioning at least one tracking device relative to at least one target object is provided. The method may comprise: obtaining a corrected location of the target object based on (1) an estimated location of the target object received at a receiver on the target object and (2) a correction measurement; obtaining a corrected location of the tracking device based on (1) an estimated location of the tracking device received at a receiver on the tracking device and (2) the correction measurement; and determining a position of at least one of the tracking device or the target object based on the corrected location of the target object and the corrected location of the tracking device, such that the tracking device and the target object are positioned relative to each other to achieve a positional goal.

According to another aspect of the disclosure, a non-transitory computer-readable medium storing instructions that, when executed, causes a computer to perform a method for positioning at least one tracking device relative to at least one target object, is provided. The method may comprise: determining a corrected location of the target object based on (1) an estimated location of the target object received at a receiver on the target object and (2) a correction measurement; obtaining a corrected location of the tracking device based on (1) an estimated location of the tracking device received at a receiver on the tracking device and (2) the correction measurement; and determining a position of at least one of the tracking device or the target object based on the corrected location of the target object and the corrected location of the tracking device, such that the tracking device and the target object are positioned relative to each other to achieve a positional goal.

A tracking system may be provided in accordance with an additional aspect of the disclosure. The system may comprise: a tracking device; and one or more actuators configured to effect movement to determine a position of the tracking device based on a corrected location of the tracking device and a corrected location of an target object, to position the tracking device and the target object relative to each other to achieve a positional goal, wherein the corrected location of the target object is based on (1) an estimated location of the target object received at a receiver on the target object and (2) a correction measurement, and wherein the corrected location of the tracking device is based on (1) an estimated location of the tracking device received at a receiver on the tracking device and (2) the correction measurement.

Further aspects of the disclosure may be directed to a method for positioning at least one mobile tracking device relative to at least one target object. The method may comprise: obtaining a real-time location of the target object to an accuracy at within a 5 centimeters level; obtaining a real-time location of the mobile tracking device to an accuracy within at a 5 centimeter level; and determining a position of at least one of the mobile tracking device or the target object based on the real-time location of the target object and the real-time location of the mobile tracking device, such that the target object and the mobile tracking device are positioned relative to each other to achieve a positional goal to within 10 cm tolerance level.

According to an aspect of the disclosure, an apparatus for positioning at least one mobile tracking device relative to at least one target object is provided. The apparatus may comprise one or more processors that are, individually or collectively, configured to: obtain a real-time location of the target object to an accuracy within 5 centimeters; obtain a real-time location of the mobile tracking device to an accuracy within 5 centimeters; and determine a position of at least one of the mobile tracking device or the target object based on the real-time location of the target object and the real-time location of the mobile tracking device, such that the target object and the mobile tracking device are positioned relative to each other to achieve a positional goal to within a 10 centimeter tolerance level.

According to another aspect of the disclosure, a non-transitory computer-readable medium storing instructions that, when executed, causes a computer to perform a method for positioning at least one mobile tracking device relative to at least one target object is provided. The method may comprise: obtaining a real-time location of the target object to an accuracy within 5 centimeters; obtaining a real-time location of the mobile tracking device to an accuracy within 5 centimeters; and determining a position of at least one of the mobile tracking device or the target object based on the real-time location of the target object and the real-time location of the mobile tracking device, such that the target object and the mobile tracking device are positioned relative to each other to achieve a positional goal to within a 10 centimeter tolerance level.

A vehicle may be provided in accordance with an additional aspect of the disclosure. The vehicle may comprise: a tracking device; and one or more actuators configured to effect movement to determine a position of the tracking device based on a real-time location of the tracking device and a real-time location of a target object, to position the tracking device and the target object relative to each other to achieve a positional goal to within a 10 centimeter level, wherein the real-time location of the target object is obtained to an accuracy within 5 centimeters, and wherein the real-time location of the tracking device is obtained to an accuracy within 5 centimeters.

Further aspects of the disclosure may be directed to a method for positioning a plurality of movable objects relative to one another. The method may comprise: obtaining an estimated location of each movable object; and determining relative positions between the plurality of movable objects based on: (1) the estimated location of each movable object and (2) a correction measurement.

According to an aspect of the disclosure, an apparatus for positioning a plurality of movable objects relative to one another is provided. The apparatus may comprise one or more processors that are, individually or collectively, configured to: obtain an estimated location of each movable object; and determine relative positions between the plurality of movable objects based on: (1) the estimated location of each movable object and (2) a correction measurement.

According to another aspect of the disclosure, a non-transitory computer-readable medium storing instructions that, when executed, causes a computer to perform a method for positioning a plurality of movable objects relative to one another, is provided. The method may comprise: obtaining an estimated location of each movable object; and determining relative positions between the plurality of movable objects based on: (1) the estimated location of each movable object and (2) a correction measurement.

A mobile system may be provided in accordance with an additional aspect of the disclosure. The system may comprise: a plurality of movable objects; and one or more processors that are, individually or collectively, configured to determine relative positions between the plurality of movable objects based on: (1) the estimated location of each movable object and (2) a correction measurement.

It shall be understood that different aspects of the disclosure can be appreciated individually, collectively, or in combination with each other. Various aspects of the disclosure described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

Features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Systems, methods, and devices provided herein permit the relative position between a tracking device and a target object to be determined with high accuracy and/or precision, thereby improving the tracking accuracy of the device. The relative position may be determined based on an estimated location of the tracking device, an estimated location of the object, and a correction measurement. The tracking accuracy of the device may be improved through use of the correction measurement. The correction measurement may be made based on an estimated location of a reference location, such as a base station, and a known location of the reference location. For instance, the known location of a base station may serve as a reference point for determining the relative position between the tracking device and the object.

In some embodiments, the positions of the tracking device and the target object may be determined, such that the tracking device and the object are positioned relative to each other to achieve a positional goal. The positional goal may include a predetermined spatial configuration between the device and the object. In some embodiments, the positions of the tracking device and the object may be determined in real-time, in order to achieve a positioning tolerance level. The positioning tolerance level may be, for example, at a centimeter level. In some embodiments, the dynamic formation, alignment, or collaboration of at least one tracking device and at least one object may be determined with high accuracy using the systems, methods, and devices provided herein.

It shall be understood that different aspects of the disclosure can be appreciated individually, collectively, or in combination with each other. Various aspects of the disclosure described herein may be applied to any of the particular applications set forth below or for any other types of remotely controlled vehicles or movable objects.

The present disclosure provides embodiments of systems, devices, and/or methods for improving the positioning accuracy of an unmanned aerial vehicle (UAV), and to improve tracking accuracy of the vehicle. Description of the UAV may apply to any type of vehicle, such as land-bound, underground, underwater, water surface, aerial, or space-based vehicles.

Figure 1:
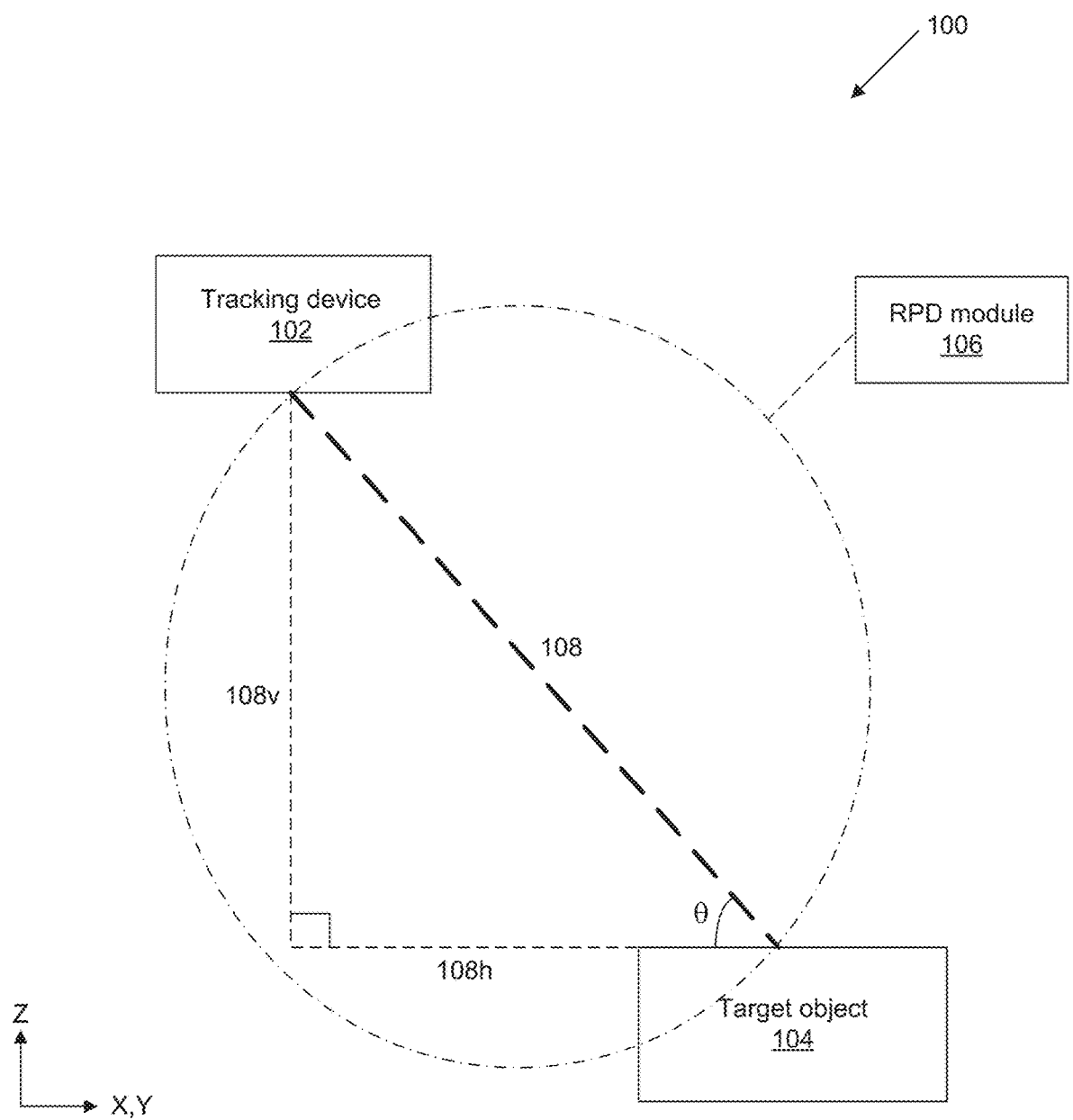
FIG. 1 illustrates a positioning system for determining a corrected relative position between a tracking device and a target object, in accordance with some embodiments.

FIG. 1 illustrates a positioning system 100 for determining a corrected relative position between a tracking device 102 and a target object 104, in accordance with some embodiments. A relative position determination (RPD) module 106 may be provided in accordance with embodiments of the disclosure. The RPD module may be configured to determine the corrected relative position between the tracking device and the target object. The tracking device may be stationary or mobile. The target object may be stationary or mobile. In some embodiments, the corrected relative position between the tracking device and the target object may be determined while at least one of the tracking device or the target object is in motion or is capable of motion. At any given moment in time, the tracking device or the target object may be capable of moving and/or stopping. For instance a UAV may hover for a period of time before moving to another location. The corrected relative position may closely correspond to a relative position between the actual locations of the tracking device and the target object, in contrast to their estimated locations, as described later in the specification.

In some embodiments, the RPD module may be located remotely from the tracking device and the target object. For example, the RPD module may be disposed in a remote server that is in communication with the tracking device and/or the target object. The RPD module may be provided at any other type of external device (e.g., remote controller for a tracking device, an object carried by the target object, a reference location such as a base station, another tracking device), or may be distributed on a cloud computing infrastructure. In some other embodiments, the RPD module may be located on the tracking device. For example, the RPD module may be disposed in a housing of the tracking device. In some further embodiments, the RPD module may be located on the target object. For example, the RPD module may be disposed on the target object. In some further embodiments, the RPD module may be disposed at a base station that is in communication with the tracking device and/or the target object. The RPD module may be located anywhere, as long as the RPD module is capable of determining the corrected relative position between the tracking device and the target object. The RPD module may communicate with the tracking device, the target device, the base station, or any other device to receive data indicative of positions of the tracking device and the target object.

In some embodiments, the tracking device may be a UAV. In some instances, the tracking device may be implemented on or provided in a UAV. Any description herein of a UAV may apply to any other type of aerial vehicle, or any other type of movable object, and vice versa. The tracking device may be capable of self-propelled motion. The description of a UAV may apply to any type of unmanned movable object (e.g., which may traverse the air, land, water, or space). The UAV may be capable of responding to commands from a remote controller. The remote controller need not be physically connected to the UAV, and may communicate with the UAV wirelessly from a distance. In some instances, the UAV may be capable of operating autonomously or semi-autonomously. The UAV may be capable of following a set of pre-programmed instructions. In some instances, the UAV may operate semi-autonomously by responding to one or more commands from a remote controller while otherwise operating autonomously. For instance, one or more commands from a remote controller may initiate a sequence of autonomous or semi-autonomous actions by the UAV in accordance with one or more parameters.

The UAV may have one or more propulsion units that may permit the UAV to move about in the air. The one or more propulsion units may enable the UAV to move about one or more, two or more, three or more, four or more, five or more, six or more degrees of freedom. In some instances, the UAV may be able to rotate about one, two, three or more axes of rotation. The axes of rotation may be orthogonal to one another. The axes of rotation may remain orthogonal to one another throughout the course of the UAV's flight. The axes of rotation may include a pitch axis, roll axis, and/or yaw axis. The UAV may be able to move along one or more dimensions. For example, the UAV may be able to move upwards due to the lift generated by one or more rotors. In some instances, the UAV may be capable of moving along a Z axis (which may be up relative to the UAV orientation), an X axis, and/or a Y axis (which may be lateral). The UAV may be capable of moving along one, two, or three axes that may be orthogonal to one another.

The UAV may be a rotorcraft. In some instances, the UAV may be a multi-rotor craft that may include a plurality of rotors. The plurality of rotors may be capable of rotating to generate lift for the UAV. The rotors may be propulsion units that may enable the UAV to move about freely through the air. The rotors may rotate at the same rate and/or may generate the same amount of lift or thrust. The rotors may optionally rotate at varying rates, which may generate different amounts of lift or thrust and/or permit the UAV to rotate. In some instances, one, two, three, four, five, six, seven, eight, nine, ten, or more rotors may be provided on a UAV. The rotors may be arranged so that their axes of rotation are parallel to one another. In some instances, the rotors may have axes of rotation that are at any angle relative to one another, which may affect the motion of the UAV.

The UAV may have a housing. The housing may include one or more internal cavities. The UAV may include a central body. The UAV may optionally have one or more arms branching from the central body. The arms may support the propulsion units. One or more branch cavities may be within the arms of the UAV. The housing may or may not include the arms that branch from the central body. In some instances, the housing may be formed from an integral piece that encompasses the central body and the arms. Alternatively, separate housings or pieces are used to form the central body and arms.

Optionally, the tracking device may be movable by changing spatial location (e.g., translating in an X direction, Y direction, and/or Z direction). Alternatively or in combination, the tracking device may be configured to change orientation within space. For instance, the tracking device may be capable of rotating about a yaw axis, a pitch axis, and/or a roll axis. In one example, the tracking device may not substantially change spatial location, but may change angular orientation (e.g., a security camera mounted on a stationary support, such as a structure). In another example, the tracking device may not substantially change orientation but may change spatial location. In some instances, the tracking device may be capable of both changing spatial location and angular orientation.

The target object may be any object configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The target object can be a vehicle, such as a remotely controlled vehicle. In some embodiments, the target object can be a living subject, such as a human or an animal, or a group of humans or a group of animals. Alternatively, the target object may be carried by a living subject, such as a human or an animal, or a movable object such as a vehicle. The target may optionally be a substantially stationary object, such as a geographic feature, plants, landmarks, or structures.

The target object may be capable of moving freely within the environment with respect to six degrees of freedom (e.g., three degrees of freedom in translation and three degrees of freedom in rotation). Alternatively, the movement of the target object can be constrained with respect to one or more degrees of freedom, such as by a predetermined path, track, or orientation. The movement can be actuated by any suitable actuation mechanism, such as an engine or a motor. The actuation mechanism of the target object can be powered by any suitable energy source, such as electrical energy, magnetic energy, solar energy, wind energy, gravitational energy, chemical energy, nuclear energy, or any suitable combination thereof. The target object may be self-propelled via a propulsion system, such as described further below. The propulsion system may optionally run on an energy source, such as electrical energy, magnetic energy, solar energy, wind energy, gravitational energy, chemical energy, nuclear energy, or any suitable combination thereof.

In some instances, the target object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The target object may be a same type of movable object as the tracking device, or may be a different type of movable object as the tracking device. For instance, both the tracking device and the target object may be UAVs. The tracking device and the target object may be the same type of UAV or different types of UAVs. Different types of UAVs may have different shapes, form factors, functionality, or other characteristics.

As previously described, the RPD module may be configured to determine the corrected relative position between the tracking device and the target object. The corrected relative position may be defined by a distance 108 between the tracking device and the target object. The distance may be measured between a predefined point on the tracking device and a predefined point on the target object. The distance may comprise a horizontal distance component 108$h$ and a vertical distance component 108$v$. The horizontal distance component may be given by the length of a vertical line that extends from the tracking device and intersects with a horizontal plane of the target object. The horizontal plane may extend in the X-Y axes. The vertical distance component may be given by the length of a horizontal line that extends from the target object and intersects with a vertical plane of the tracking device. The vertical plane may extend in the Z-X axes, and/or the Z-Y axes. The tracking device may be located relative to the target object by an angle $\theta$ between the distance 108 and its horizontal component 108$h$. The horizontal distance component may optionally be a magnitude of the horizontal component of the distance between the tracking device and the target object. Alternatively, the horizontal component may be based into multiple components, such as a latitude and longitude component. In some instances, the distance 108 may represent the magnitude of the distance between the tracking device and target object without being broken up into different components. Angular data, such as an angle $\theta$ or a horizontal angle, may provide directionality.

Figure 2:
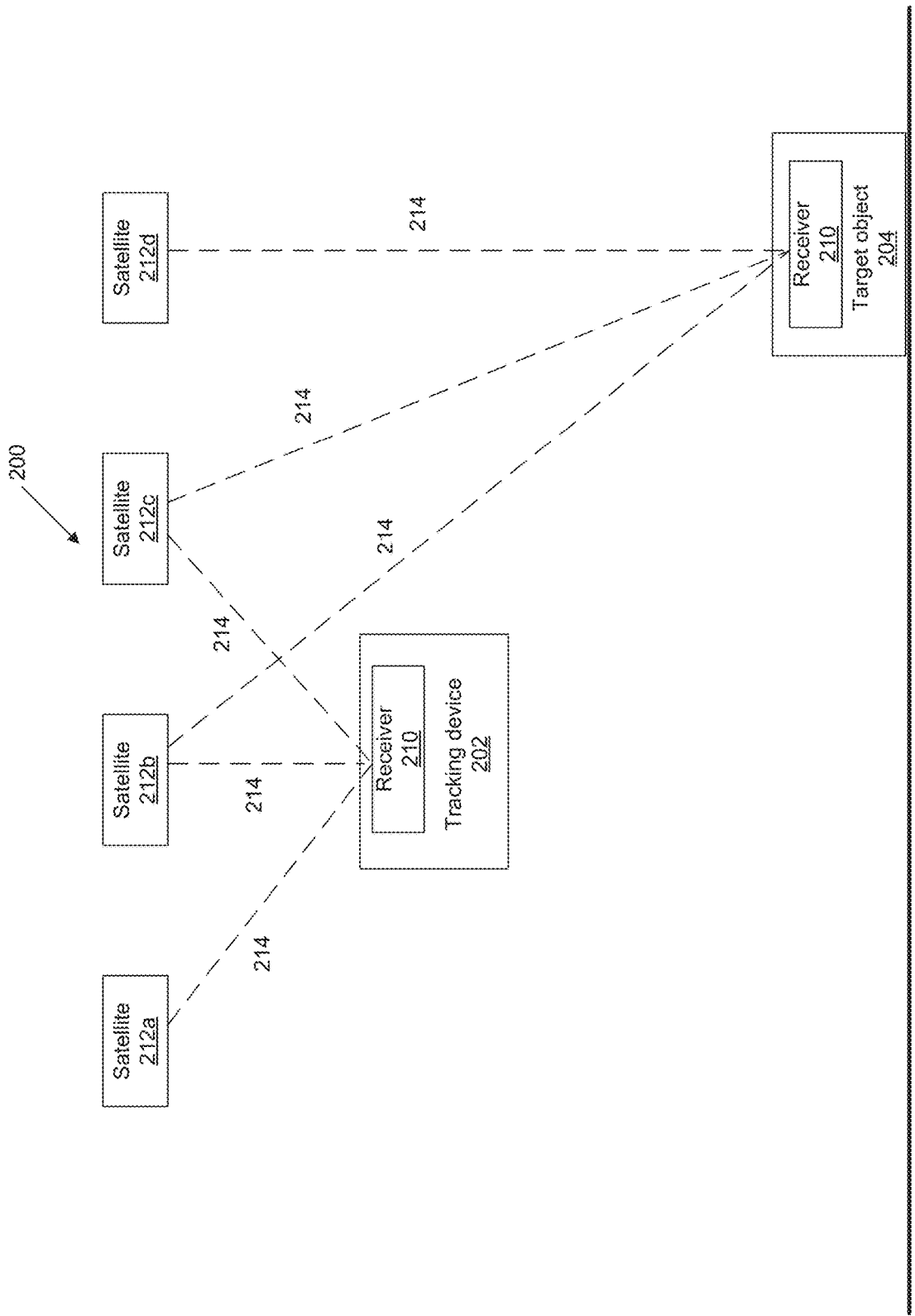
FIG. 2 illustrates a positioning system in which estimated locations of a tracking device and a target object may be obtained, in accordance with some embodiments.

The RPD module may be configured to determine the actual relative position between the tracking device and the target object, based on an estimated location of the target object and an estimated location of the tracking device. The estimated locations of the target object and the tracking device may be obtained using the positioning system 200 illustrated in FIG. 2. Specifically, FIG. 2 illustrates a global navigation satellite system (GNSS) that may be used to obtain the estimated locations of the target object and the tracking device. GNSS is a term that is used to describe a satellite system that can be used to pinpoint the geographic location of a user's GNSS receiver anywhere in the world. A GNSS system generally can be, for example, a Global Positioning System (GPS), a Global Orbiting Navigation Satellite System (GLONASS), a Galileo system, or a Beidou system. A GNSS system may employ a constellation of orbiting satellites working in conjunction with a network of ground stations. The estimated locations of the target object and the tracking device may be in three dimensional Cartesian coordinates with an origin defined at the earth's center.

Referring to FIG. 2, each of the tracking device 202 and target object 204 may include a receiver 210 disposed therein. For example, the receiver may be disposed in a housing of the tracking device or the target object. In some instances, the receiver may be disposed outside the housing of the tracking device or the target object. In some embodiments, when the target object is a person, the receiver may be disposed on the person's body, for example, as a receiver embedded within a user device. The user device may be a computing device. For example, the user device can include, among other things, a desktop computer, a laptop or a notebook computer, a mobile device (e.g., a smart phone, a cell phone, a personal digital assistant (PDA), or a tablet), or a wearable device (e.g., a smartwatch). The user device can also include any other media content player, for example, a set-top box, a television set, a video game system, or any electronic device capable of providing or rendering data. The user device may include known computing components, such as one or more processors, and one or more memory devices storing software instructions executed by the processor(s) and data.

The receivers may be GNSS receivers configured to receive GNSS signals 214 transmitted from one or more satellites 212. Each receiver may be configured to receive GNSS signals from a number of satellites (e.g., 3 or more) that are located closest to the receiver and that are in view from the receiver. The estimated location of the target object may be obtained based on a first set of GNSS signals received at the target object. The estimated location of the tracking device may be determined based on a second set of GNSS signals received at the tracking device. In the example of FIG. 2, the receiver on each of the tracking device and the target object may be in communication with three satellites. However the receivers may be in communication with any number of satellites. For example, the receiver on the tracking device may receive GNSS signals from satellites 212a, 212b, and 212c, whereas the receiver on the target object may receive GNSS signals from satellites 212b, 212c, and 212d. The receivers on the tracking device and the target object may receive the first set and the second set of GNSS signals at different times, since the target object and the tracking device are usually located at different distances from the different satellites.

Each GNSS receiver may include an antenna, a front end module, a baseband signal processing module, and/or an applications processing module. The antenna may be, for example, an L-band antenna configured to receive the GNSS signals. The received GNSS signals may often include noise and interference due to atmospheric effects. As such, the front end module may be configured to down-convert, filter, amplify and digitize the incoming GNSS signals. The baseband signal processing module may include signal processing routines that may be used to acquire and track the different signals. The applications processing module may be configured to process the resulting GNSS information, so as to provide meaningful results to a user (e.g., the estimated positions of the tracking device and the target object).

The GNSS receivers can determine the estimated position, velocity, and precise time (PVT) by processing the signals broadcasted by the satellites. Since the satellites may be constantly in motion (orbit), the GNSS receivers may continuously acquire and track the signals from the satellites that are in view, in order to compute an uninterrupted solution. Each GNSS receiver may comprise one or more processors configured to calculate a navigation solution by computing the receiver's distance to a set of satellites. The receiver's distance may be computed by extracting the propagation time of the incoming signals travelling through space at the speed of light, according to local clocks disposed at each satellite and each receiver. The time difference is transformed into a pseudorange by multiplying the time difference by the speed of the light in the vacuum. The pseudorange may be a rough estimate of the true range between satellite and user.

The estimated locations of the target object and tracking device may be obtained using triangulation of the GNSS signals, through calculations involving information from a number of satellites. Each satellite may transmit coded signals at precise intervals. The GNSS signals may include a pseudorandom code (sequence of ones and zeros) that is known to the receiver. By time-aligning a receiver-generated version and the receiver-measured version of the code, the time of arrival (TOA) of a defined point in the code sequence, called an epoch, can be found in the receiver clock time scale. The GNSS signals may also include a message that includes the time of transmission (TOT) of the code epoch (in GPS system time scale) and the satellite position at that time. The receivers can convert the aforementioned signal information into position, velocity, and time estimates. Using this information, the receiver can calculate the exact position of the transmitting satellite and the distance (based on the transmission time delay) between the satellite and the receiver. Subsequently, the estimated positions of the tracking device and the target object may be obtained by triangulating the signal data from a number of satellites.

However, in most instances, the estimated locations of the target object and the tracking device may deviate from their respective actual locations by a positional error. The positional error may arise from errors due to propagation of the GNSS signals through atmospheric layers and due to noise measurements. The errors may include satellite clock error, orbital error, ionospheric error, tropospheric error, receiver clock error, and/or multipath error.

In some instances, the positional error may range from about 1 m, 2 m, 3 m, 4 m, 5 m, 6 m, 7 m, 8 m, 9 m, 10 m, or more than 10 m. The positional error may have a horizontal accuracy component and/or a vertical accuracy component. The horizontal accuracy component may be provided as a CEP (Circular Error Probability). The horizontal and vertical accuracy components may be collectively provided as a Spherical Error Probability (SEP). CEP and SEP may be used as a measure of GPS accuracy for GNSS real-time measurements. CEP accuracy is associated with horizontal accuracy and only applies to a horizontal plane (i.e., a position on a map). CEP is defined as the radius of a circle centered on the true value that contains 50% of the actual GPS measurements. Unlike CEP, SEP applies to both horizontal and vertical planes. For a 50th percentile, half the data points or positions would fall within a sphere of this radius.

For example, a receiver with 1 meter CEP accuracy will be within one meter of the true measurement 50% of the time. For the other 50% of the time, the measurement will be in error by more than one meter. In some instances, CEP measurements of a same point on the ground may differ by twice the probability. For example, if a receiver has CEP of 1 meter, different measurements of the same point may differ by 2 meters.

The vertical accuracy component of the estimated location may be two to five times worse than the horizontal accuracy component. This is due to the locations of the satellites relative to the location of the receivers. The vertical accuracy component is difficult to calculate because the satellites have a limited perspective from which to measure height. The vertical accuracy component can be accurately measured if the receiver can receive GNSS signals from underneath the receiver (i.e., from the opposite side of the earth). However, the earth blocks those signals. Also, the arcs of the GNSS signal transmission are more vertical than horizontal, and a result, there is more error in the vertical accuracy component.

In some cases, the horizontal accuracy component may be specified in terms of Distance Root Mean Square (DRMS). This is the square root of the average of the squared horizontal position errors, where there is a 65% probability of the actual position being within the probability circle. In some cases, the horizontal accuracy component may be specified by twice the DRMS of the horizontal position errors, where there is a 95% probability of the actual position falling within the defined probability circle. The 2DRMS circle is twice the radius of the DRMS circle. Similarly, a 3DRMS circle gives a 97.5% probability and is three time the radius of the DRMS circle.

Since the estimated locations of the tracking device and the target object contain positional errors that may be significant, the relative position between the tracking device and the target object may not be accurately determined based on their estimated locations alone. For example, the relative position between the tracking device and the target object may not be determined with a centimeter level accuracy based on their estimated locations alone. To accurately determine the relative position between the tracking device and the target object, a correction measurement may be used. The correction measurement may be applied to the estimated locations of the tracking device and the target object, to compensate for the positional errors.

Figure 3:
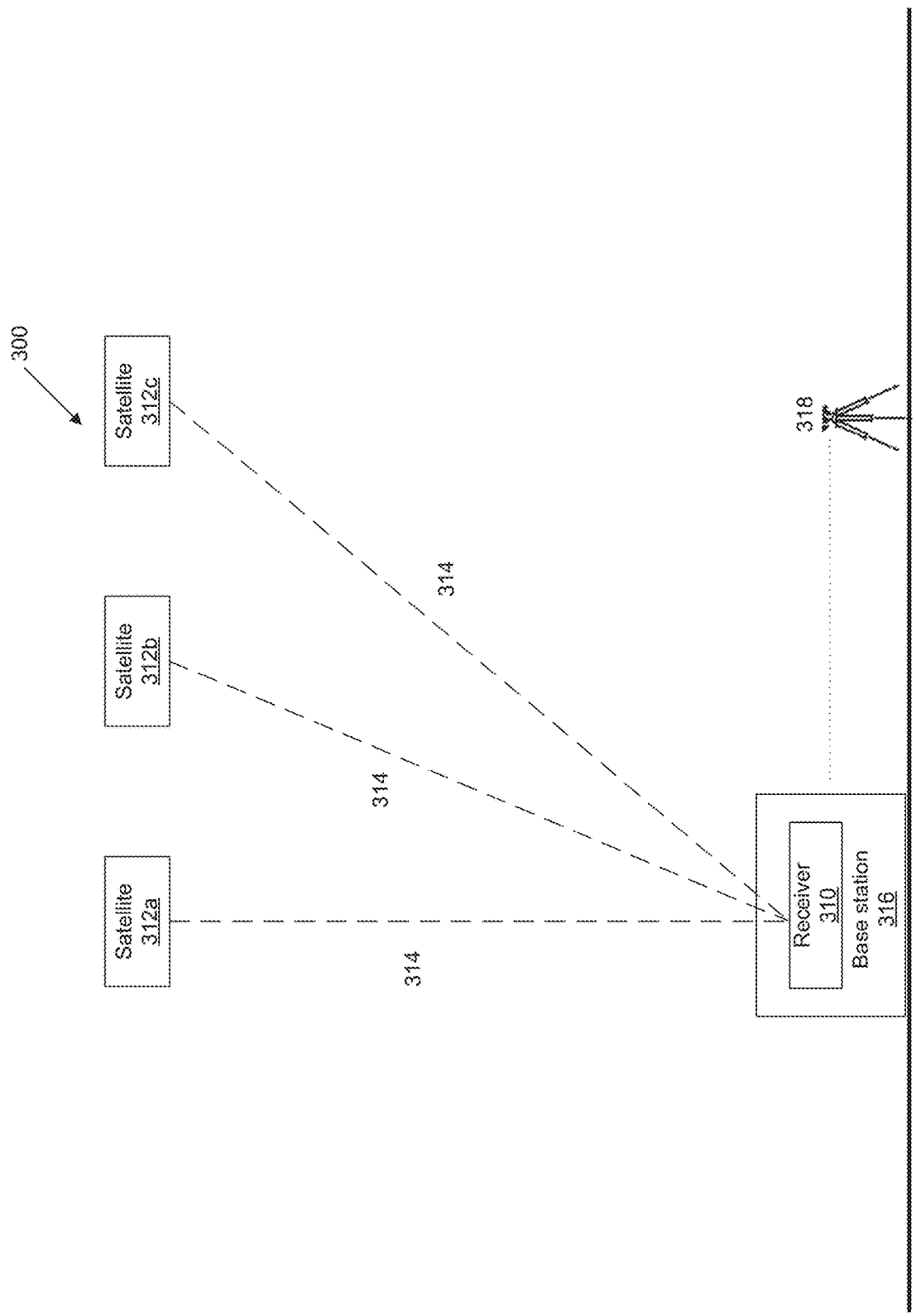
FIG. 3 illustrates a positioning system in a correction measurement may be obtained, in accordance with some embodiments.

The correction measurement may be generated using the setup illustrated in FIG. 3. Specifically, FIG. 3 illustrates a positioning system 300 in which a correction measurement may be obtained, in accordance with some embodiments. Referring to FIG. 3, a base station 316 may be provided. The base station may comprise a receiver 310 disposed therein. The receiver may be a GNSS receiver configured to receive GNSS signals 314 transmitted from one or more satellites 312. The receiver may be configured to receive GNSS signals from a number of satellites (e.g., 3 or more) that are located closest to the receiver and that are in view from the receiver. For example, in the embodiment of FIG. 3, the receiver at the base station may be in communication with three satellites 312a, 312b, and 312c. The estimated location of the base station may be obtained based on a set of GNSS signals received by the receiver at the base station.

Any description herein of a base station may apply to any type of reference location with a known location. The reference location may be stationary. Alternatively, the reference location may be movable but have a known location to a high level of precision, such as precision values described in greater detail elsewhere herein. The reference location may be supported on the ground, on a stationary structure or object, or on a movable structure or object.

Similar to the tracking device and the target object, the estimated location of the base station may also deviate from its actual location by a positional error. The positional error may arise from errors due to propagation of the GNSS signals through atmospheric layers and due to noise measurements. The errors may include satellite clock error, orbital error, ionospheric error, troposheric error, receiver clock error, and/or multipath error.

To correct for those errors, the correction measurement may be made based on the estimated location of the base station and a known location of the base station. The known location of the base station may be an accurately surveyed location having a set of known global spatial coordinates. The known location of the base station may be obtained using a surveying instrument 318. The surveying instrument may include a theodolite and steel band, a total station, a level and rod, surveying GPS systems, 3D scanners, various forms of aerial imagery, and/or other surveying tools known to those skilled in the art. The surveying instrument can be used to obtain the terrestrial or three-dimensional position of points, and the distances and angles between them, at the base station. The actual location of the base station may be known to a high degree of precision, such as a degree of precision within 20 cm, 15 cm, 12 cm, 10 cm, 7 cm, 5 cm, 4 cm, 3 cm, 2 cm, 1.5 cm, 1 cm, 0.7 cm, 0.5 cm, 0.3 cm, 0.1 cm, 0.05 cm, or 0.01 cm. The known location of the base station may be accurate to within any of the values described herein.

The correction measurement may be a difference between the estimated location of the base station and the known location of the base station. For example, the correction measurement may comprise a spatial difference between the estimated location of the base station and the known location of the base station. The spatial difference may be provided in three dimensional Cartesian coordinates.

Figure 4:
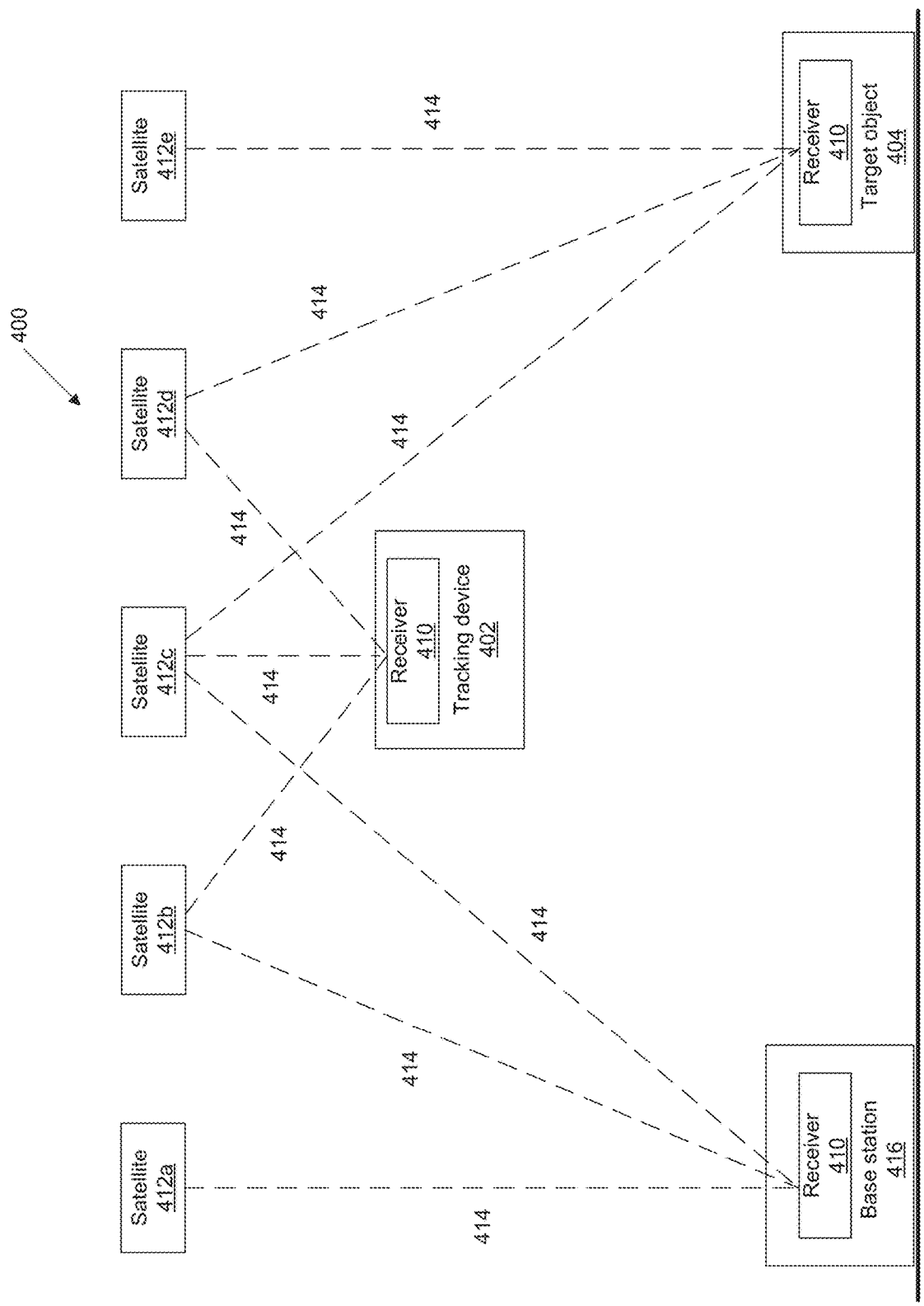
FIG. 4 illustrates a positioning system comprising a tracking device, a target object, and a base station, in accordance with some embodiments.

For the correction measurement to be useful, the tracking device and the target object may need to be located in a vicinity of the base station. This is because the accuracy of the correction measurement may decrease with increasing distance from the base station, due to atmospheric effects affecting signal propagation to the different receivers disposed at the base station, the tracking device, and the target object. FIG. 4 illustrates a positioning system 400 comprising the tracking device 402, the target object 404, and the base station 416. The corresponding base station used to provide a correction measurement for the tracking device and the target object may be within a predetermined range of the tracking device and/or the target object. In some embodiments, the tracking device and the target object may be located within a range of about 20 km from the base station. In some embodiments, the tracking device and the target object may be located within a range of about 20 km, 25 km, 30 km, 35 km, 40 km, 45 km, 50 km, or more from the base station. The range may be defined as a circle with the base station at its center. In some instances, one or more base stations that are closest to the tracking device and/or the target object may be selected.

As shown in FIG. 4, the receivers 410 at the base station, tracking device, and target object may be configured to receive GNSS signals 414 from a plurality of satellites 412. The plurality of satellites may be configured to orbit around earth. In some alternative embodiments, the plurality of satellites may be stationary and fixed at points in space. In the example of FIG. 4, the receiver on each of the tracking device, the target object, and the base station may be in communication with three satellites. For example, the receiver at the base station may receive a first set of GNSS signals from satellites 412a, 412b, and 412c; the receiver on the tracking device may receive a second set of GNSS signals from satellites 412b, 412c, and 412d; and the receiver on the target object may receive a third set of GNSS signals from satellites 412c, 412d, and 412e. The respective receivers may receive the first set, second set, and third set of GNSS signals at different times, since the base station, tracking device, and target object are usually located at different distances from the different satellites.

Figure 5:
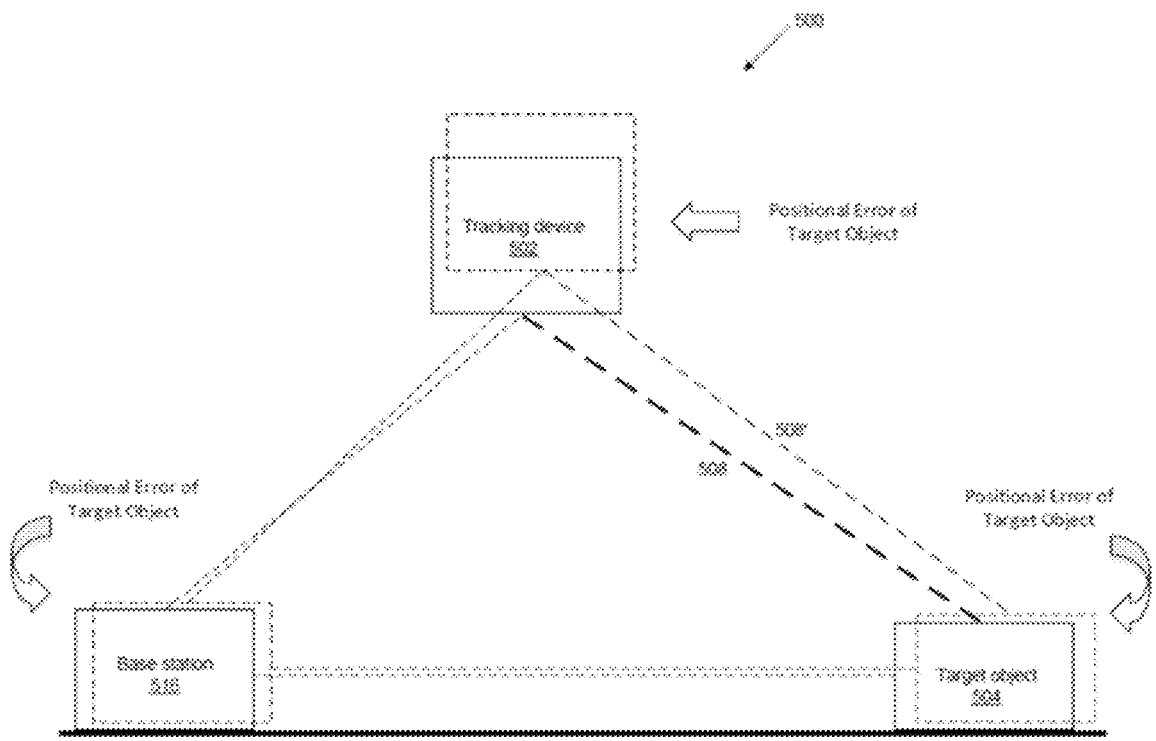
FIG. 5 illustrates positional errors in the estimated locations of a tracking device, a target object, and a base station, in accordance with some embodiments.

The estimated locations of the base station, tracking device, and target object may be obtained from the GNSS signals. The estimated locations may have different positional errors. For example, FIG. 5 illustrates the difference between the actual locations and the estimated locations of the base station, tracking device, and target object. The actual locations are depicted by the solid boxes, whereas the estimated locations are depicted by the dotted boxes. The dotted lines connecting the boxes indicate the relative position between the actual locations and the estimated locations. For example, the relative position between the estimated location of the tracking device and the estimated location of the target object may be defined by a distance 508'. In contrast, the relative position between the actual location of the tracking device and the actual location of the target object may be defined by a distance 508. As shown in FIG. 5, the actual relative position (defined by distance 508) and the estimated relative position (defined by distance 508') may be different due to the aforementioned positional errors. As a result, the tracking device may not be able to accurately track the target object to a centimeter accuracy level using the estimated relative positions alone, which have positional errors on the order of several meters. Embodiments of the disclosure can enable the tracking of a target object to a centimeter level accuracy or less by a tracking device using an RPD module, as described below.

Figure 6:
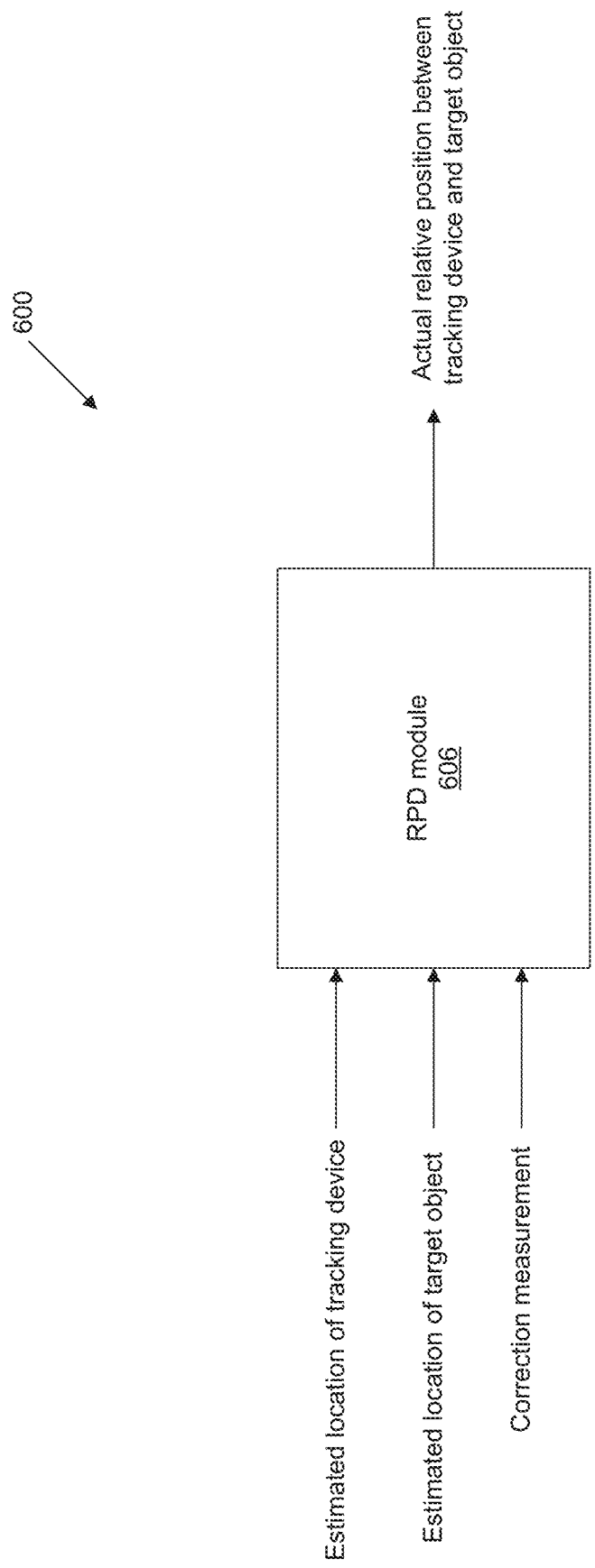
FIG. 6 illustrates a block diagram of an exemplary relative positioning determination (RPD) module, in accordance with some embodiments.

An exemplary RPD module can determine the relative position between the actual locations of the tracking device and the target object with high accuracy. For example, the actual locations of the tracking device and/or the target object can be obtained to within the levels of precision described elsewhere herein. FIG. 6 illustrates a block diagram of an RPD module 606, in accordance with some embodiments. Referring to FIG. 6, the RPD module may be configured to determine the corrected relative position between the tracking device and the target object. The tracking device and the target object may correspond to the tracking device and the target object illustrated in FIGS. 1, 2, 4, and 5. The corrected relative position may be determined based on: (1) the estimated location of the target object, (2) the estimated location of the mobile tracking device, and (3) the correction measurement. The corrected relative position may correspond to a spatial configuration between the target object and the tracking device. The spatial configuration may comprise, for example, a distance between the target object and the tracking device. The distance may include a vertical distance component between the tracking device and the target object, and/or a horizontal distance component between the tracking device and the target object. In some embodiments, the RPD module can determine the vertical distance component independent of a barometer. The RPD module can determine the vertical distance without requiring information from any additional sensors. For instance, the RPD module can determine the vertical distance without requiring information from a sensor on-board the UAV (e.g., barometer, ultrasonic sensor, vision sensor, thermal sensor, magnetic sensor). The RPD module can determine the vertical distance without requiring information from a sensor on-board that utilizes reflective signals. In some instances, the spatial configuration may comprise an attitude or an orientation of the tracking device relative to the target object.

The correction measurement may be made at a base station having a known location. The base station may correspond to the base station illustrated in FIGS. 3, 4, and 5. The known location of the base station may be an accurately surveyed location having a set of known global spatial coordinates. The known location of the base station may serve as a datum reference from which the corrected relative position between target object and the tracking device may be determined. The known location may be provided within a centimeter level precision.

The correction measurement may be made based on the estimated location of the base station and the known location of the base station. The correction measurement may be a difference between the estimated location of the base station and the known location of the base station.

In some embodiments, the correction measurement may be based on a differential GNSS technique. Differential GNSS (DGNSS) is a type of GNSS augmentation system based on an enhancement to primary GNSS constellation(s) information by using one or more reference/base stations which enable the broadcasting of differential information to improve the accuracy of a GNSS estimated location. Given that the location of the base station is accurately known, the deviation of the estimated location to the actual location can be calculated using differential GNSS. The differential GNSS technique may comprise making the correction measurement to GNSS carrier phase measurements and/or pseudorange measurements of the received GNSS signals. In some instances, the correction measurement may be made by performing real-time kinematic (RTK) calculations to the GNSS carrier phase measurements and/or pseudorange measurements. Corrections to the measured pseudoranges to each of the individual satellites can be calculated using the RTK calculations. The RTK calculations may include fixing GNSS carrier phase ambiguities.

The correction measurement may be included in an RTK correction signal. The RTK correction signal may be based on a Radio Technical Commission for Maritime Services (RTCM) standard. In some embodiments, the RTK correction signal may be transmitted to the target object and the tracking device at substantially the same time ("simultaneously"). In some instances, the RTK correction signal may be transmitted to the target object and the tracking device in real-time. The RTK correction signal may be transmitted to the target object and the tracking device using mobile data protocols, wherein the mobile data protocols may include General Packet Radio Services (GPRS), GSM, Enhanced Data GSM Environment (EDGE), 3G, 4G, or Long Term Evolution (LTE) protocols.

In some embodiments, the RPD module may be configured to determine the corrected relative position between the target object and the tracking device to achieve a positional goal. The positional goal may include a predetermined distance between the tracking device and the target object. The positional goal may include a predetermined attitude of the tracking device relative to the target object. The positional goal may be achieved by substantially positioning the target object in a target region of an image frame captured using the tracking device. The image frame may be captured using an imaging device on the tracking device. The imaging device may comprise a camera. The target region may be a central region of the image frame. In some embodiments, the target region may be an edge region of the image frame.

In some embodiments, the RPD module may be configured to obtain a corrected location of the target object based on: (1) the estimated location of the target object, and (2) the correction measurement. The RPD module may also be configured to obtain a corrected location of the tracking device based on: (1) the estimated location of the tracking device, and (2) the correction measurement. The corrected location of the target object may be obtained relative to the known location of the base station. Likewise, the corrected location of the tracking device may be obtained relative to the known location of the base station.

In some embodiments, the RPD module may be configured to determine a position of the tracking device and/or the target object based on the corrected location of the target object and the corrected location of the tracking device, such that the tracking device and the target object are positioned relative to each other to achieve the positional goal. The position of at least one of the tracking device or the target object may be determined using one or more actuators. The tracking device may be located on a vehicle. The one or more actuators may be configured to effect movement of the vehicle or the tracking device relative to the vehicle to determine the position of the tracking device. In some embodiments, the vehicle may be a UAV.

In some embodiments, the RPD module can determine the position and/or the corrected location of the tracking device or the target object while at least one of the tracking device, the target object, or the base station is in motion. The target object, tracking device, and the base station may be stationary or movable. In some embodiments, the target object may be movable, and the position of at least one of the tracking device or the target object may be determined while the target object is in motion. In some other embodiments, the tracking device may be movable, and the position of at least one of the tracking device or the target object may be determined while the tracking device is in motion. In some further embodiments, the base station may be stationary, and the position of at least one of the tracking device or the target object may be determined with the base station being stationary. In some alternative embodiments, the base station may be movable, and the position of at least one of the tracking device or the target object may be determined while the base station is in motion.

A positional goal between the tracking device and the target object may be achieved by adjusting a movement characteristic of the tracking device and/or the target object. The movement characteristic of the tracking device may comprise at least one of an attitude, an instantaneous position, a velocity, or an acceleration of the tracking device. The movement characteristic of the target object may comprise at least one of an attitude, an instantaneous position, a velocity, or an acceleration of the target object. In some embodiments, the movement characteristic of at least one of the tracking device or the target object may be adjusted such that the movement characteristic of the tracking device is substantially the same as the movement characteristic of the target object. In some instances, the movement characteristic of the tracking device may be the velocity of the tracking device and the movement characteristic of the target object may be the velocity of the target object. In other instances, the movement characteristic of the tracking device may be the acceleration of the tracking device and the movement characteristic of the target object may be the acceleration of the target object.

The positional goal may include a predetermined distance between the tracking device and the target object. The predetermined distance may include a vertical distance between the tracking device and the target object, and a horizontal distance between the tracking device and the target object. The vertical distance may be determined independent of a barometer. The horizontal distance may be determined to an accuracy within 2 centimeters (or any of the values described elsewhere herein) when the tracking device and the target object are stationary, and to an accuracy within 5 centimeters (or any of the values described elsewhere herein) when the tracking device and/or the target object are moving. The vertical distance may be determined to an accuracy within 3 centimeters (or any of the values described elsewhere herein) when the tracking device and the target object are stationary, and to an accuracy within 5 centimeters (or any of the values described elsewhere herein) when the tracking device and/or the target object are moving. Optionally, the stationary accuracy may be greater in the horizontal distance than the vertical distance, or vice versa. Optionally, the stationary accuracy may be greater than an accuracy with movement. The RPD module may be further configured to control an altitude of the tracking device based on the corrected location of the tracking device and the corrected location of the target object.

The tracking device may be supported by a movable apparatus. In some embodiments, the movable apparatus may be an unmanned aerial vehicle.

In some alternative embodiments, the tracking device may be supported by a stationary apparatus. The tracking device may comprise an imaging device configured to capture a plurality of image frames over a period of time. The tracking device may comprise a carrier for the imaging device that permits the imaging device to move relative to a supporting structure. The imaging device may be an optical camera. In some embodiments, the imaging device may be a thermal imaging device. The imaging device may utilize ultrasonic or acoustic signals to image a target. The plurality of image frames may be captured while at least one of the target object or the tracking device is in motion. The positional goal may be achieved by substantially positioning the target object in a target region of each image frame. The target region may be a central region of each image frame. In some embodiments, the target region may be an edge region of each image frame. In some embodiments, the RPD module may be further configured to determine the position of at least one of the tracking device or the target object by comparing the plurality of image frames to one another, such that the tracking device and the target object are positioned relative to each other to achieve the positional goal.

In some embodiments, the RPD module can determine the positions of the tracking device and/or at least one object in real-time to achieve a positioning tolerance level. For example, the RPD module may be configured to obtain a real-time location of the target object to an accuracy within 5 centimeters (or any other high precision value, as described elsewhere herein), and obtain a real-time location of the tracking device to an accuracy within 5 centimeters (or any other high precision value, as described elsewhere herein). The RPD module may be further configured to determine a position of the tracking device and/or the target object based on the real-time location of the target object and the real-time location of the tracking device, such that the target object and the tracking device are positioned relative to each other to achieve a positional goal to within 10 cm tolerance level (or any other high precision value, as described elsewhere herein).

The position of the tracking device and/or the target object may be affected using one or more actuators. In some embodiments, the tracking device may be located on a vehicle. The one or more actuators may be configured to effect movement of the vehicle or the tracking device relative to the vehicle to determine the position of the tracking device. In some embodiments, the vehicle may be an unmanned aerial vehicle.

In some embodiments, the real-time location of the target object may be substantially the same as a corrected location of the target object, and the real-time location of the tracking device may be substantially the same as a corrected location of the tracking device. As previously mentioned, the corrected location of the target object may be determined based on: (1) the estimated location of the target object, and (2) the correction measurement. The corrected location of the tracking device may be determined based on: (1) the estimated location of the tracking device, and (2) the correction measurement.

As previously described, the RPD module may be located anywhere, as long as the RPD module is capable of determining the corrected relative position between the tracking device and the target object. FIGS. 7, 8, 9, and 10 illustrate different embodiments where the RPD module may be located.

Figure 7:
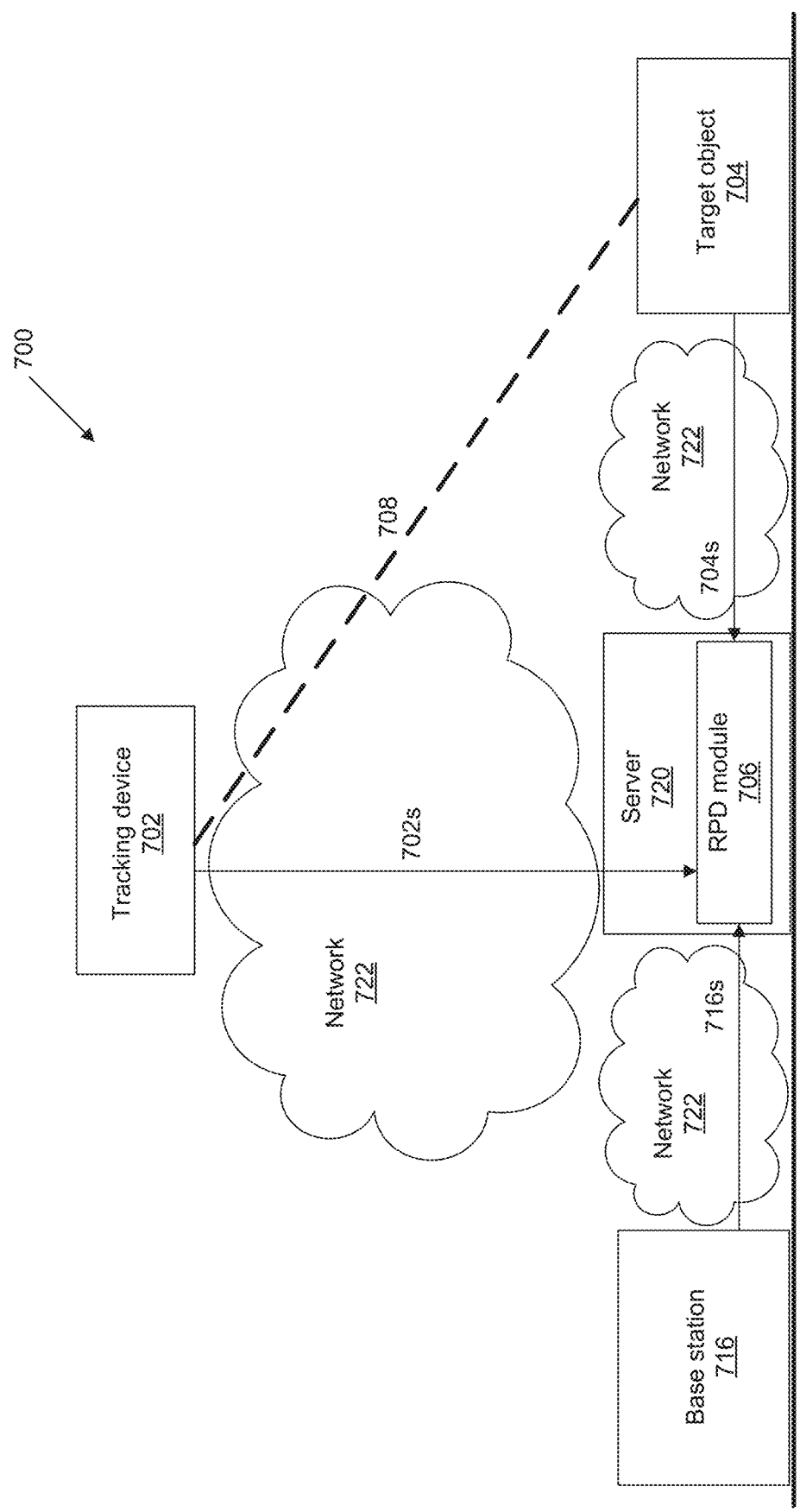
FIG. 7 illustrates a positioning system in which an exemplary RPD module is located remotely, in accordance with some embodiments.

For example, FIG. 7 illustrates a positioning system 700 in which an exemplary RPD module is located remotely. In the example of FIG. 7, the RPD module 706 may be located remotely from the tracking device 702, the target object 704, and the base station 716. In some instances, the RPD module may be disposed in a remote server 720 that is in communication with the tracking device and/or the target object.

The server may include a web server, an enterprise server, or any other type of computer server, and can be computer programmed to accept requests (e.g., HTTP, or other protocols that can initiate data transmission) from a computing device (e.g. located at the base station, on the tracking device, and/or the target object) and to serve the computing device with requested data. In addition, the server can be a broadcasting facility, such as free-to-air, cable, satellite, and other broadcasting facility, for distributing data. The server may also be a server in a data network (e.g., a cloud computing network).

As previously described, the RPD module may be included in the server. For example, the RPD module may be software and/or hardware components included with the server. The server can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the program instructions can be implemented in hardware components or combinations of hardware and software such as, for example, ASICs, special purpose computers, or general purpose computers.

Referring to FIG. 7, the RPD module 706 may be configured to receive the correction measurement 716s from the base station 716, a signal 702s from the tracking device 702, and a signal 704s from the target object 704. The signal 702s may contain information about the estimated location of the tracking device, and the signal 704s may contain information about the estimated location of the target object. As previously described, the RPD module can determine the corrected relative position between the tracking device and the target object based on: (1) the estimated location of the tracking device, (2) the estimated location of the target object, and (3) the correction measurement.

The correction measurement and the signals may be transmitted to the RPD module via one or more networks 722. Although FIG. 7 illustrates three networks 722, it may be appreciated by those in the art that the three networks can be implemented as a single network, as two networks, or more than three networks. Any number of networks may be contemplated.

The networks can enable two-way communication between the RPD module and the base station, between the RPD module and the tracking device, and between the RPD module and the target object. The network may be implemented, in some embodiments, as one or more networks that connect components in the positioning system for allowing communication between them. For example, as one of ordinary skill in the art will recognize, the network may be implemented as the Internet, a wireless network, a wired network, a local area network (LAN), a Wide Area Network (WANs), Bluetooth, Near Field Communication (NFC), or any other type of network that provides communications between one or more components of the positioning system. In some embodiments, the network may be implemented using cell and/or pager networks, satellite, licensed radio, a combination of licensed and unlicensed radio, and power line communication. The network may be wireless, wired, a mesh network, or a combination thereof.

Figure 8:
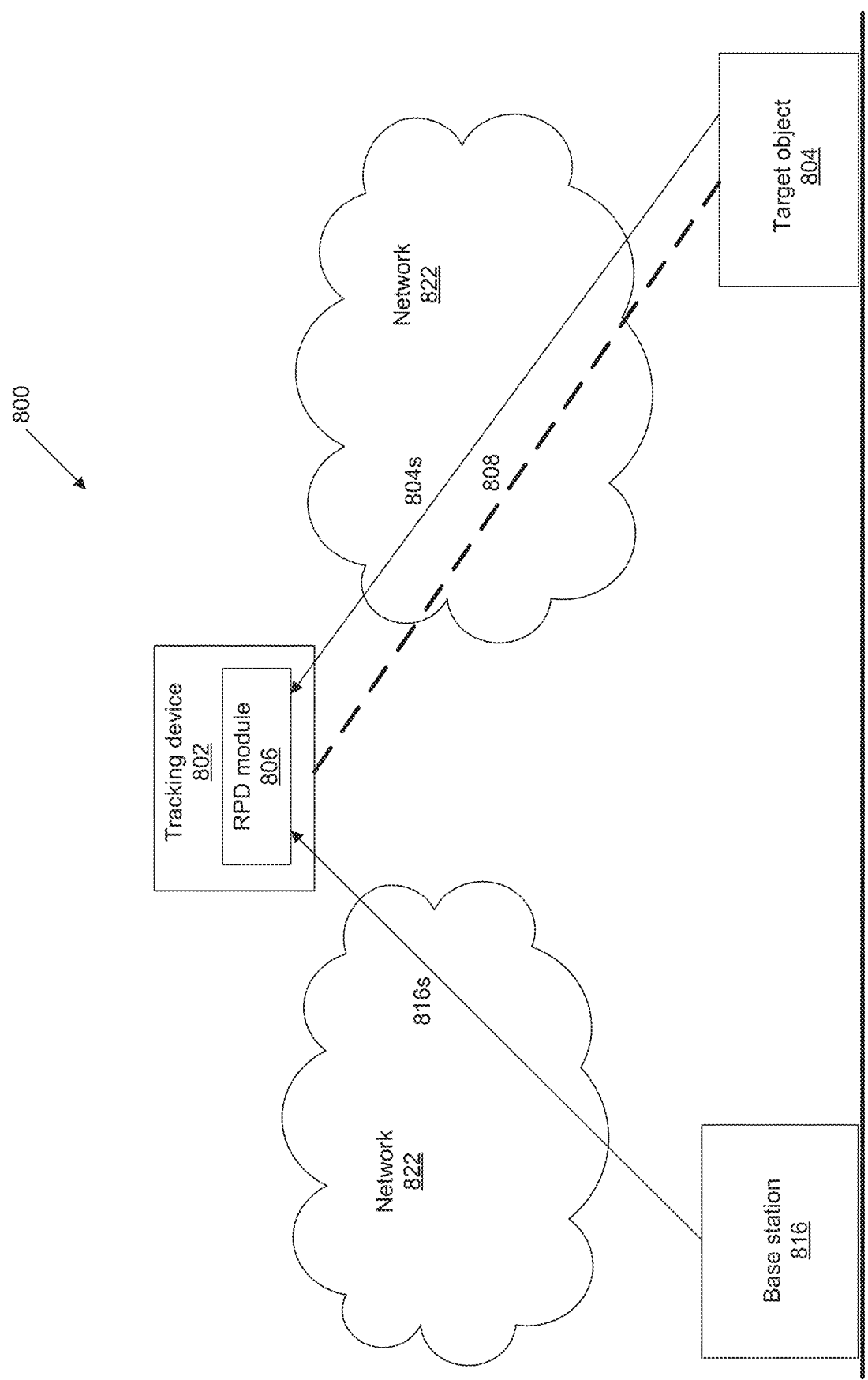
FIG. 8 illustrates a positioning system in which an exemplary RPD module is located on a tracking device, in accordance with some embodiments.

In some embodiments, the RPD module may be located in the tracking device. FIG. 8 illustrates a positioning system 800 in which the RPD module 806 is located in the tracking device 802. The RPD module may be software and/or hardware components included with the tracking device. For example, the RPD module may have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the program instructions can be implemented in hardware components or combinations of hardware and software such as, for example, ASICs, special purpose computers, or general purpose computers.

Referring to FIG. 8, the RPD module 806 may be configured to receive the correction measurement 816s from the base station 816 and a signal 804s from the target object 804. The signal 804s may contain information about the estimated location of the target object. The correction measurement and the signal may be transmitted to the RPD module via one or more networks 822. The RPD module may obtain the estimated position of the tracking device from a GNSS receiver located on the tracking device. In some instances, the GNSS receiver may be integrated into the RPD module. The RPD module may be configured to determine the corrected relative position between the tracking device and the target object based on: (1) the estimated location of the tracking device, (2) the estimated location of the target object, and (3) the correction measurement. Although FIG. 8 illustrates two networks 822, it may be appreciated by those in the art that the two networks can be implemented as a single network, or implemented as more than two networks. The networks 822 in FIG. 8 may be similar to the networks 722 in FIG. 7.

Figure 9:
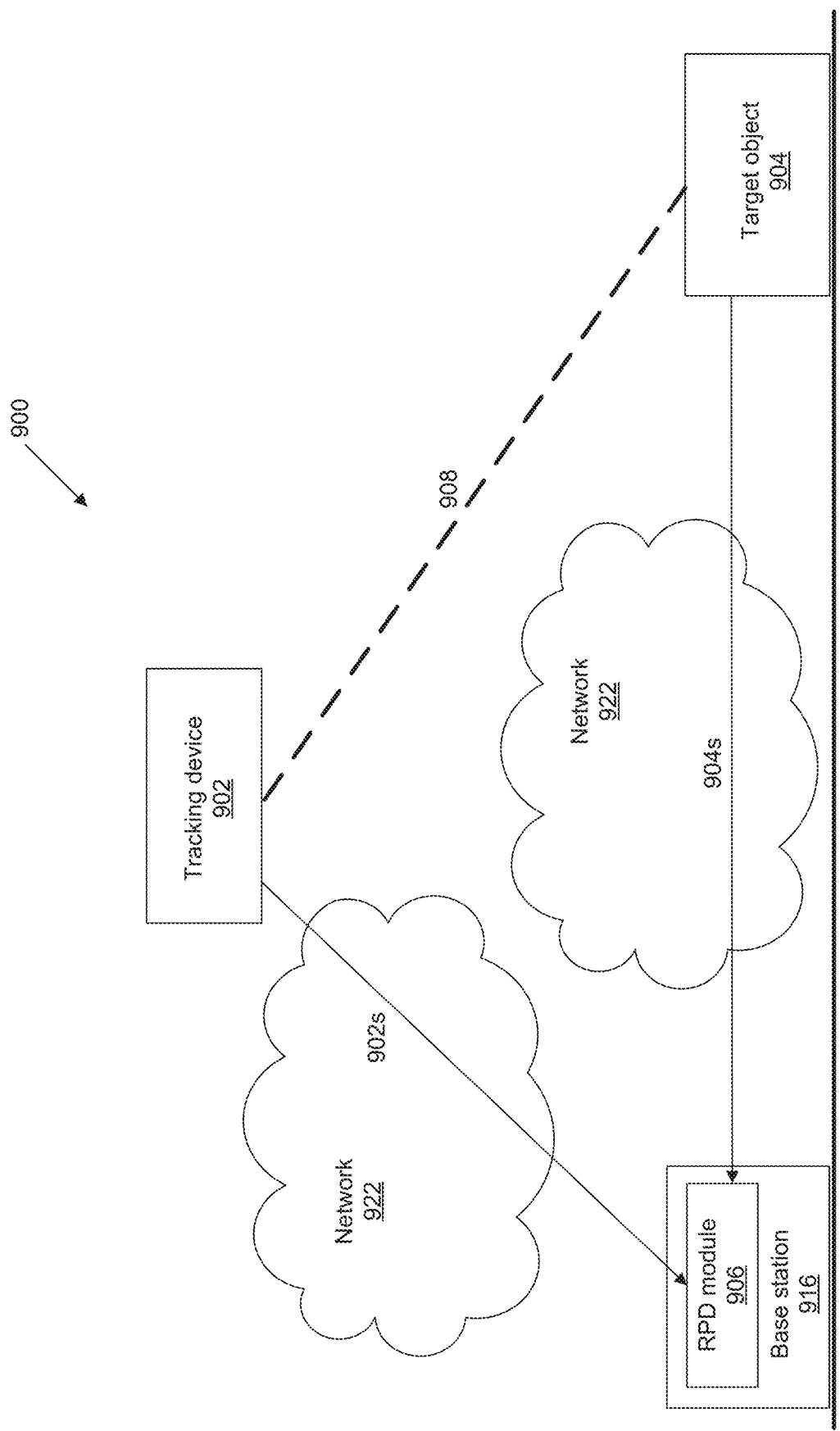
FIG. 9 illustrates a positioning system in which an exemplary RPD module is located at a base station, in accordance with some embodiments.

In some other embodiments, the RPD module may be located at the base station. FIG. 9 illustrates a positioning system 900 in which the RPD module 906 is located at the base station 916. The RPD module may be software and/or hardware components included with the base station. For example, the RPD module may have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the program instructions can be implemented in hardware components or combinations of hardware and software such as, for example, ASICs, special purpose computers, or general purpose computers.

Referring to FIG. 9, the RPD module 906 may be configured to receive the signal 902s from the tracking device 902 and the signal 904s from the target object 904. The signal 902s may contain information about the estimated location of the tracking device, and the signal 904s may contain information about the estimated location of the target object. The signals may be transmitted to the RPD module via one or more networks 922. The RPD module may calculate the correction measurement based on its estimated location obtained from a GNSS receiver at the base station and a known location. In some instances, the GNSS receiver may be integrated into the RPD module. The RPD module may be configured to determine the corrected relative position between the tracking device and the target object based on: (1) the estimated location of the tracking device, (2) the estimated location of the target object, and (3) the correction measurement. Although FIG. 9 illustrates two networks 922, it may be appreciated by those in the art that the two networks can be implemented as a single network, or implemented as more than two networks. The networks 922 in FIG. 9 may be similar to the networks 822 in FIG. 8 and the networks 722 in FIG. 7.

Figure 10:
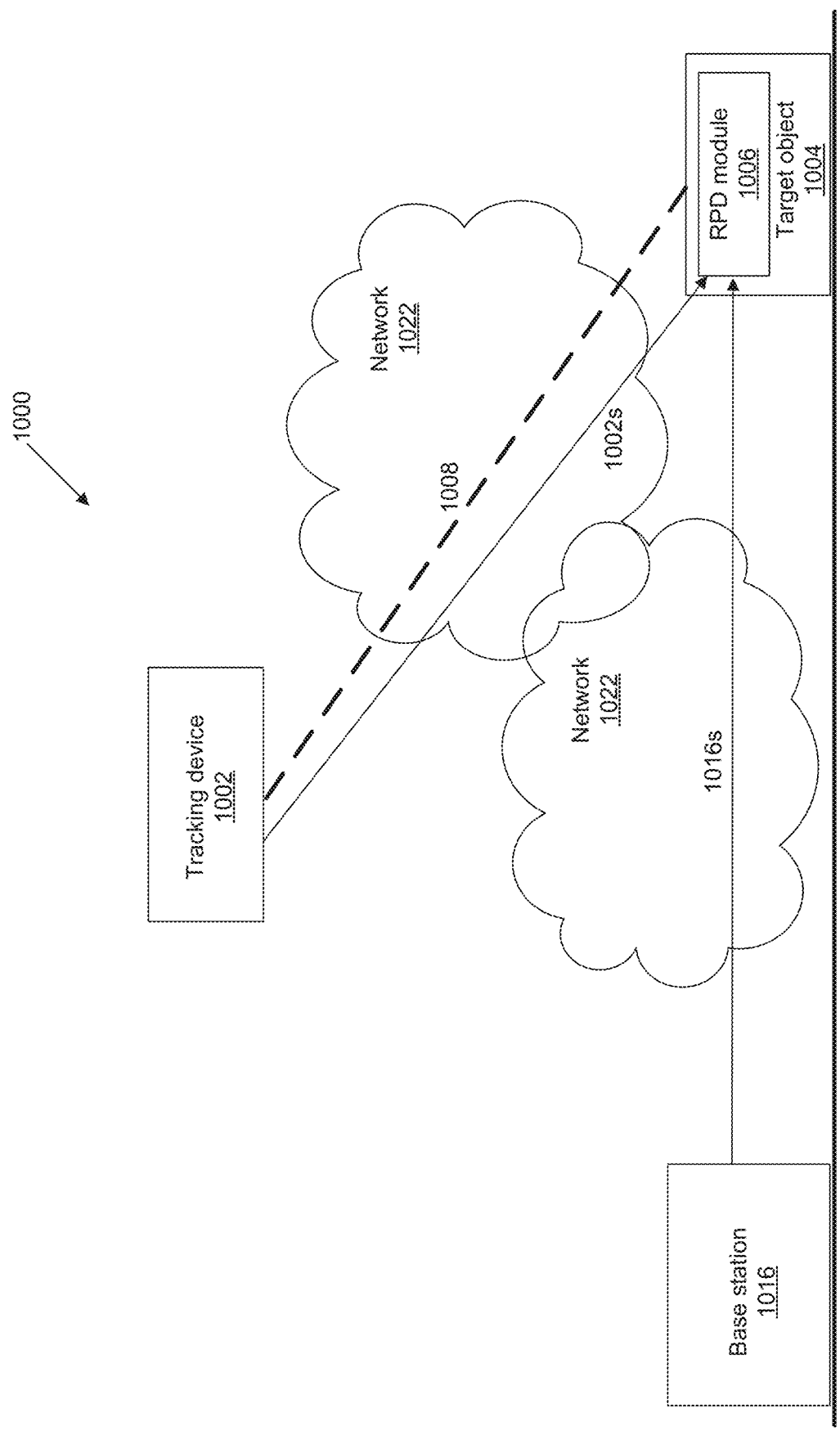
FIG. 10 illustrates a positioning system in which an exemplary RPD module is located on a target object, in accordance with some embodiments.

In some further embodiments, the RPD module may be located on the target object. FIG. 10 illustrates a positioning system 1000 in which the RPD module 1006 is located on the target object 1004. The RPD module may be software and/or hardware components included with the target object. For example, the RPD module may have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the program instructions can be implemented in hardware components or combinations of hardware and software such as, for example, ASICs, special purpose computers, or general purpose computers.

Referring to FIG. 10, the RPD module 1006 may be configured to receive the signal 1002s from the tracking device 1002 and the correction measurement 1016s from the base station 1016. The signal 1002s may contain information about the estimated location of the tracking device. The correction measurement and the signal may be transmitted to the RPD module via one or more networks 1022. The RPD module may obtain the estimated position of the target object from a GNSS receiver located on the target object. In some instances, the GNSS receiver may be integrated into the RPD module. The RPD module may be configured to determine the corrected relative position between the tracking device and the target object based on: (1) the estimated location of the tracking device, (2) the estimated location of the target object, and (3) the correction measurement. Although FIG. 10 illustrates two networks 1022, it may be appreciated by those in the art that the two networks can be implemented as a single network, or implemented as more than two networks. The networks 1022 in FIG. 10 may be similar to the networks 922 in FIG. 9, the networks 822 in FIG. 8, or the networks 722 in FIG. 7.

Figure 11:
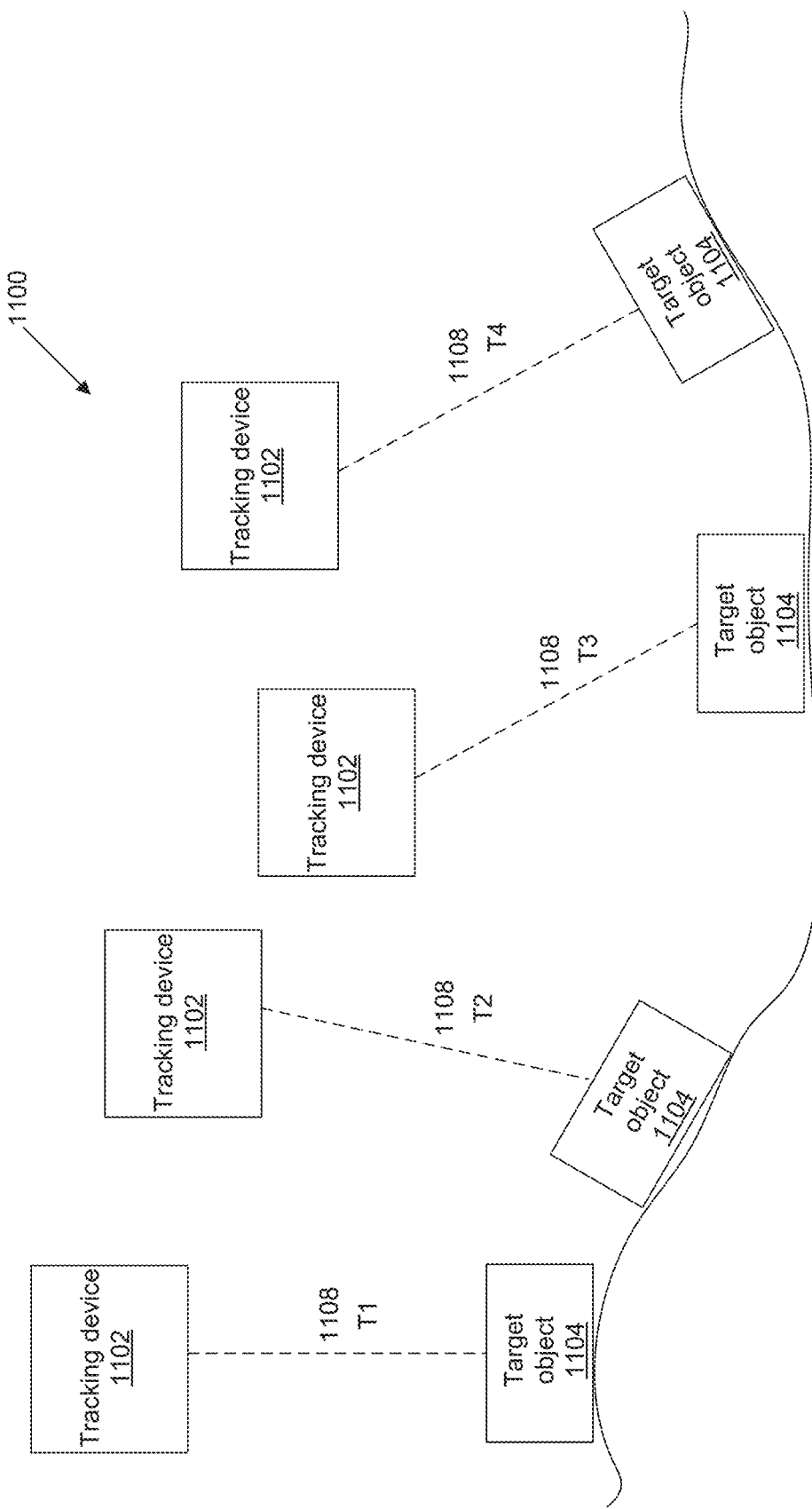
FIG. 11 illustrates the tracking of a target object using a mobile tracking device, in accordance with some embodiments.

FIG. 11 illustrates the tracking of a target object using a mobile tracking device, in accordance with some embodiments. In the tracking system 1100 of FIG. 11, an RPD module can determine the corrected relative positions 1108 between the tracking device 1102 and the target object 1104 as the tracking device follows the target object. The corrected relative positions may be accurately determined as the target object travels over a varied terrain having different elevations, and even as the distance and orientation of the tracking device relative to the target object changes. For example, at time T1, the target object may be located at a higher elevation and the tracking device may be directly above the target object. At time T2, the target object may be located at a lower elevation on a downward slope, and the tracking device may be slightly to the above right of the target object. At time T3, the target object may be located at a lowest elevation, and the tracking device may be above and substantially to the left of the target object. At time T4, the target object may be located at a higher elevation relative to its location at time T3 and on an upward slope, and the tracking device may be above and to the left of the target object. At each of the aforementioned time instances (T1, T2, T3, and T4), the RPD module can accurately determine the corrected relative position between the tracking device and the target object, using one or more of the embodiments described in FIGS. 6, 7, 8, 9, and 10.

The RPD module can further determine/control the positions of the tracking device and/or the target object based on the corrected location of the target object and the corrected location of the tracking device, such that the tracking device and the target object are positioned relative to each other to achieve a positional goal.

In some embodiments, the positional goal may comprise a predetermined distance between the tracking device and the target object. In some instances, the tracking device may fall within a specified distance of the target object. The specified distance or predetermined distance may have an overall magnitude, a horizontal magnitude, and/or a vertical magnitude. In some embodiments, the tracking device may be anywhere within a defined range. In some alternative embodiments, the tracking device may be disposed at a minimum stay-away distance from the target object.

In some embodiments, the positional goal may comprise a predetermined spatial disposition between the tracking device and the target object. For example, the tracking device may be disposed in a particular position relative to the target object. The position may include only lateral orientation, only altitude orientation, or both lateral and altitude orientation. In some embodiments, the positional goal may include only spatial disposition aspects, only orientation aspects, or both spatial and orientation disposition aspects.

In some embodiments, the positional goal may be a predetermined flight pattern relative to target object. For example, the tracking device may be circling the target object at a predetermined rate, or flying relative to the target object in a zig-zag pattern.

In some embodiments, the positional goal may relate to how an image is captured using an imaging device on the tracking device. For example, the positional goal may relate to how the image is captured (the target object appearing at a particular portion or location of the image frame, e.g. center, edge, or any other predetermined region). In some instances, the positional goal may relate to the size of the target object in the image frame (e.g., how closely the tracking device is following the target object, and/or the amount of magnification of the target object in the image frame).

In some embodiments, the positional goal may relate to how fast the tracking device is able to respond to an input to track the target object. For example, it may relate to how quickly the positional goal can be achieved. For instance, there may be a time lag that may occur within the order of seconds or milliseconds.

In some embodiments, the positional goal may be achieved through a user input. A user may provide an input from a device that indicates any of the aforementioned types of positional goals, and/or how the positional goals are to be performed. In some other embodiments, the positional goal may be achieved completely via automatic tracking.

The aforementioned goals can be achieved using the RPD module which has high precision/accuracy.

Figure 12:
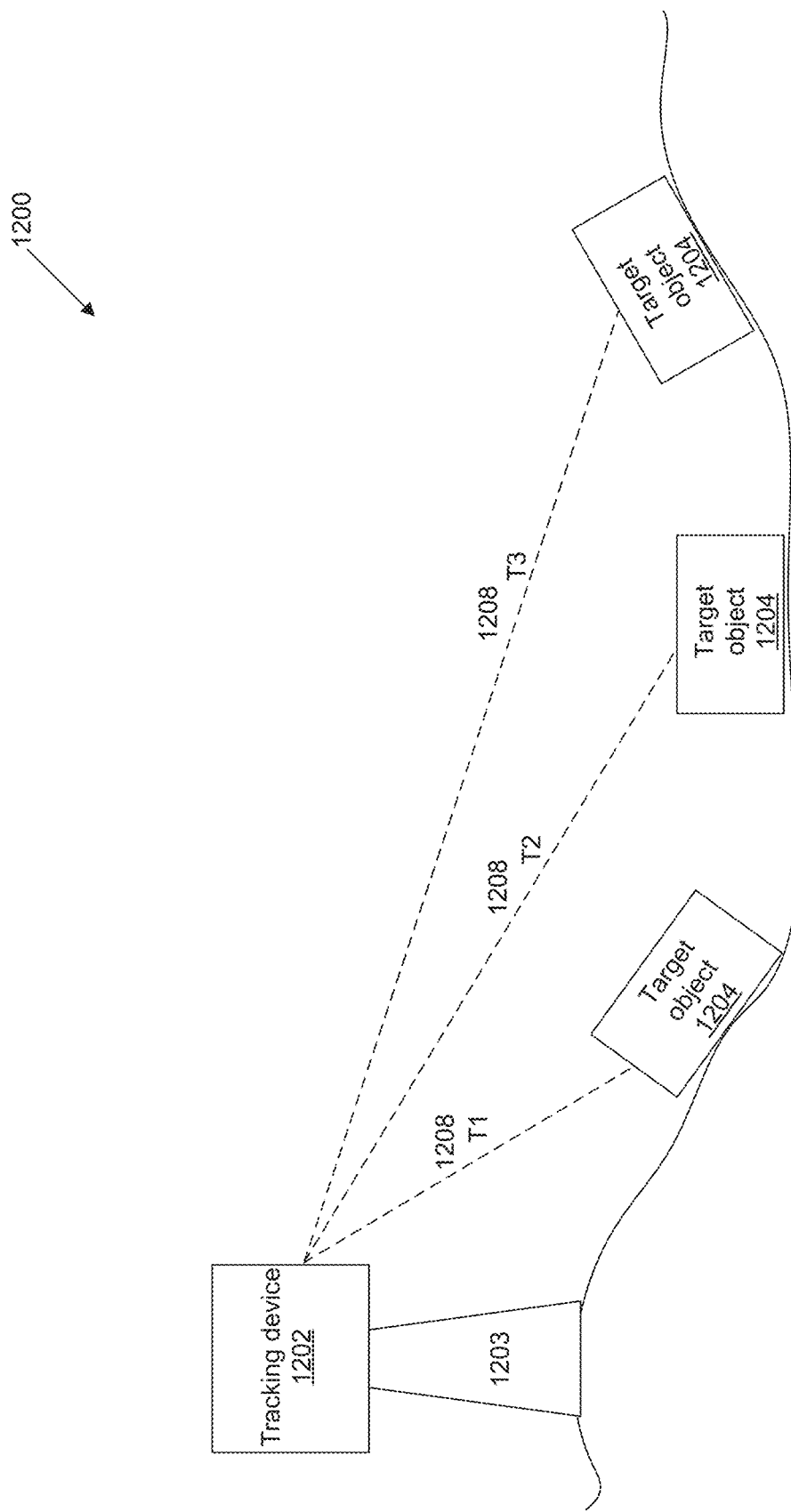
FIG. 12 illustrates the tracking of a target object using a tracking device attached to a stationary structure, in accordance with some embodiments.

In some alternative embodiments, the tracking device may be supported by a stationary structure. FIG. 12 illustrates the tracking of the target object using the tracking device attached to a stationary structure. The stationary structure may be a building, a tower, an extension post, a base station, or any type of structure (man-made or natural) that is fixed at a location. In the tracking system 1200 of FIG. 12, the tracking device may be located on a stationary structure 1203. The RPD module can determine the corrected relative positions 1208 between the tracking device 1202 and the target object 1204 as the target object moves away (or in some instances, towards) the tracking device. The corrected relative positions may be accurately determined as the target object travels over a varied terrain having different elevations, and even as the distance and orientation of the tracking device relative to the target object changes. For example, at time T1, the target object may be located on a downward slope nearer to the tracking device. At time T2, the target object may be located at a lower elevation further from the tracking device. At time T3, the target object may be located at a higher elevation relative to its location at time T2 and on an upward slope, and furthest from the tracking device. At each of the aforementioned time instances (T1, T2, and T3), the RPD module can accurately determine the corrected relative position between the tracking device and the target object, using one or more of the embodiments described in FIGS. 6, 7, 8, 9, and 10.

In some embodiments, the tracking device (e.g., in FIG. 11 and/or FIG. 12) may comprise an imaging device configured to capture a plurality of image frames over a period of time. The tracking device may comprise a carrier for the imaging device that permits the imaging device to move relative to a supporting structure. The imaging device may be an optical camera. In some alternative embodiments, the imaging device may be a thermal imaging device. The plurality of image frames may be captured while the target object and/or the tracking device is in motion. The RPD module can enable a positional goal to be achieved by substantially positioning the target object in a target region of each image frame. The target region may be a central region of each image frame. In some embodiments, the target region may be an edge region of each image frame. In some embodiments, the RPD module can determine the location of the tracking device and/or the target object by comparing the plurality of image frames to one another, such that the tracking device and the target object are positioned relative to each other to achieve the positional goal.

Figure 13:
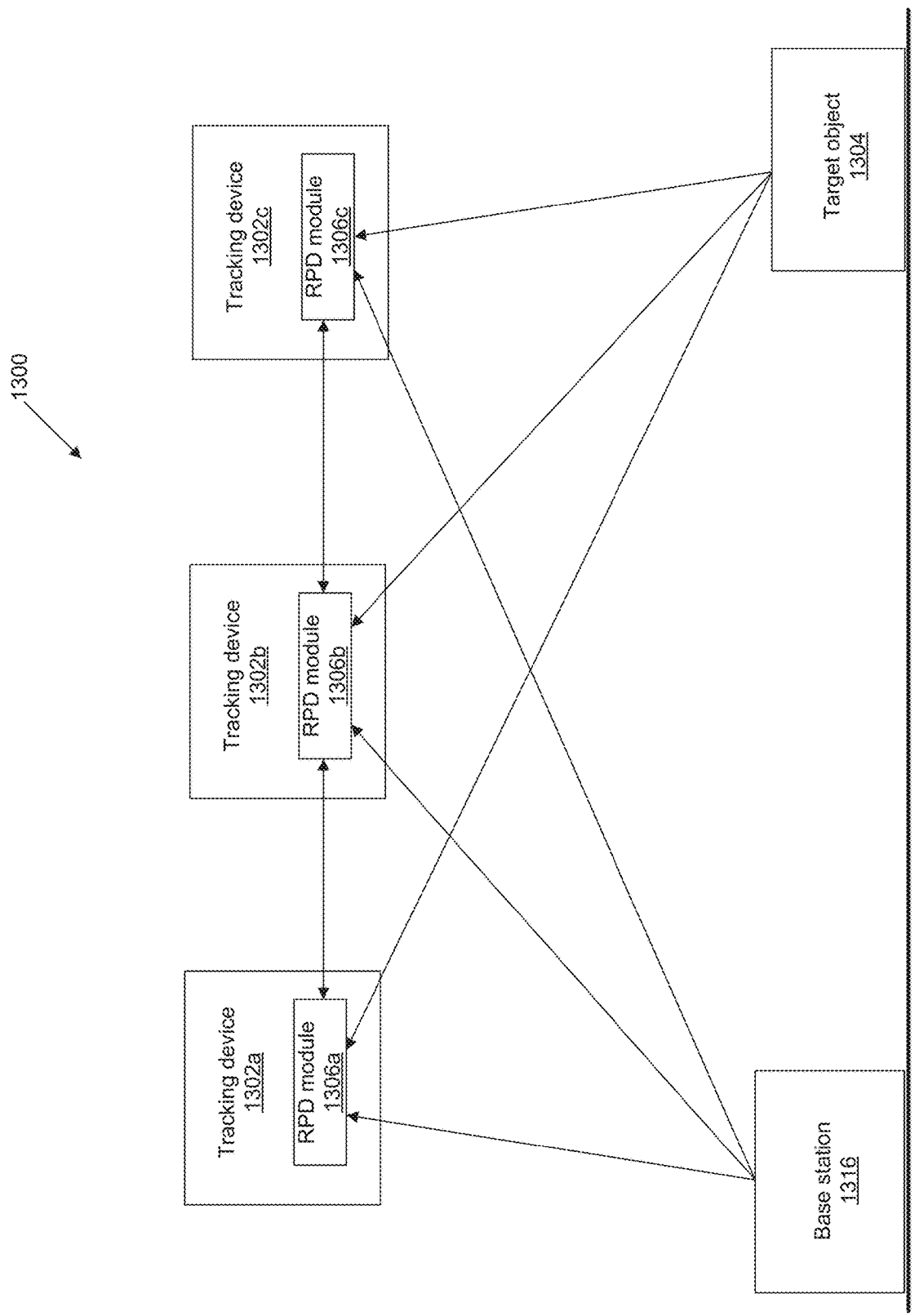
FIG. 13 illustrates a positioning system for determining the corrected relative positions between a plurality of tracking devices and a target object, in accordance with some embodiments.

In some embodiments, the tracking device may be provided in plural. FIG. 13 illustrates a positioning system 1300 for determining the corrected relative positions between a plurality of tracking devices and a target object, in accordance with some embodiments. Referring to FIG. 13, the system comprises a plurality of tracking devices 1302a, 1302b, and 1302c, a target object 1304, and a base station 1316. In the example of FIG. 13, the tracking device 1302a includes the RPD module 1306a, the tracking device 1302b includes the RPD module 1306b, and the tracking device 1302c includes the RPD module 1306c. In some instances, the RPD modules 1306a, 1306b, and 1306c may be integrated into a single RPD module that is located in one of the tracking devices. In some instances, the RPD module(s) may be located at the base station or the target object. In some instances, the RPD module(s) may be located remotely from the tracking devices, the target object, and the base station.

Figure 15:
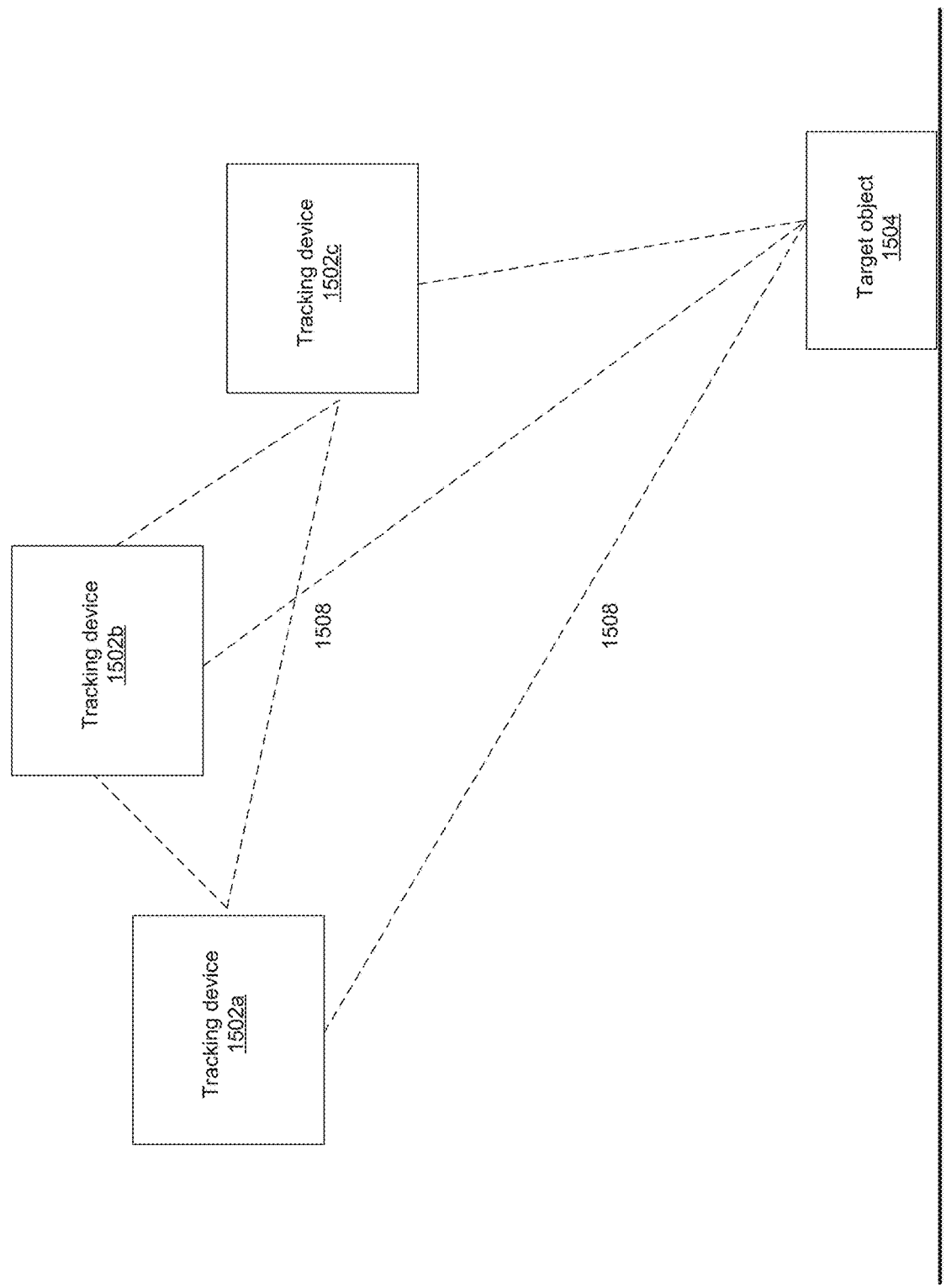
FIG. 15 illustrates the tracking of a target object using a plurality of tracking devices, in accordance with some further embodiments.
Figure 16:
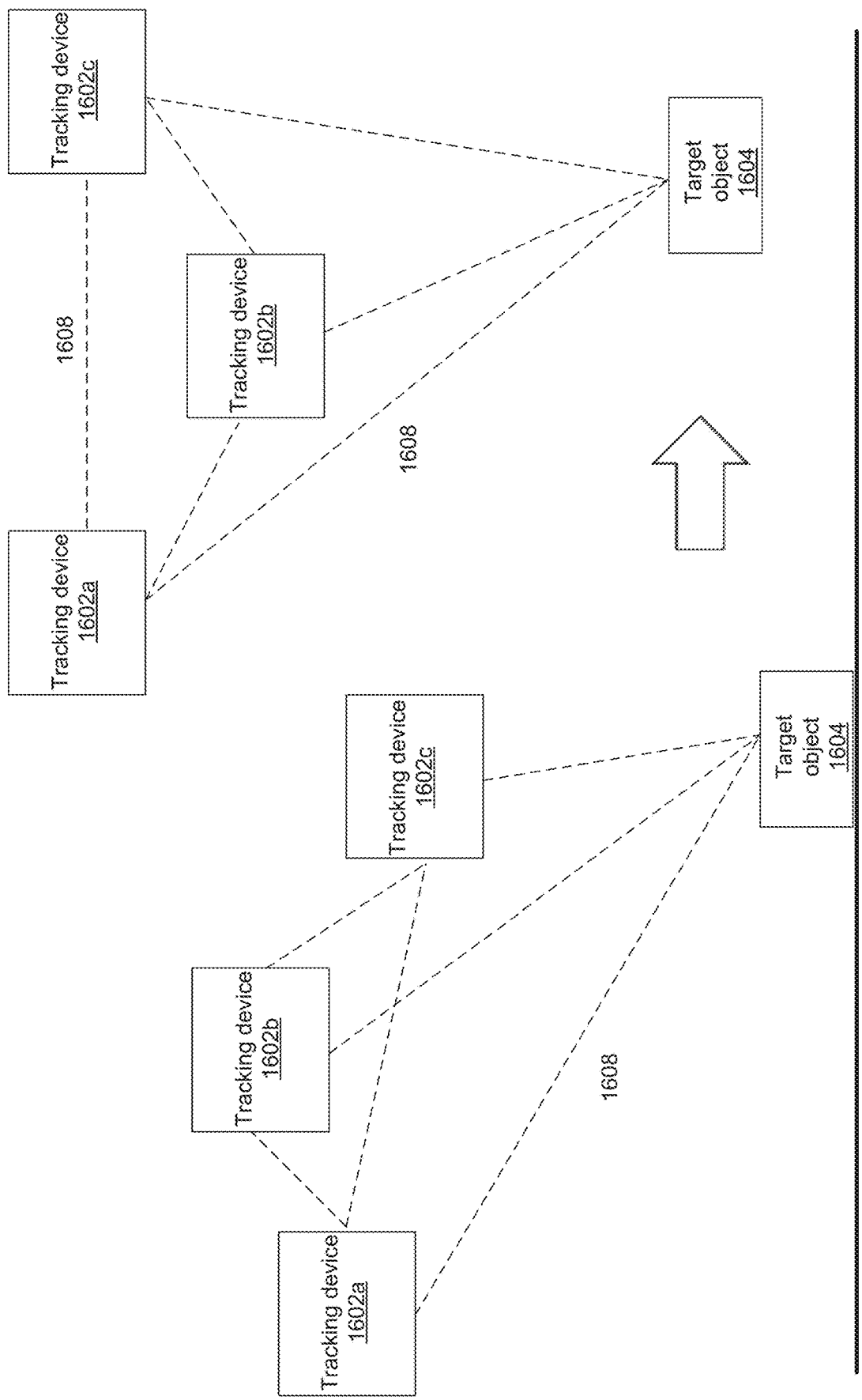
FIG. 16 illustrates the tracking of a movable target object using a plurality of mobile tracking devices as the devices and the object move from a first position to a second position, in accordance with some embodiments.

Referring to FIG. 13, the RPD module 1306a may receive a signal from the target object and the correction measurement from the base station. Similarly, the RPD module 1306b may receive a signal from the target object and the correction measurement from the base station. Likewise, the RPD module 1306c may receive a signal from the target object and the correction measurement from the base station. The signals may contain information about the estimated location of the target object. The RPD modules may be in communication with one another. For example, each RPD module may receive the estimated locations of the other tracking devices, and/or corrected locations of the other tracking devices. The RPD modules can be used to determine the corrected relative positions between the tracking devices and the target object, as illustrated in FIGS. 14, 15, and 16.

Figure 14:
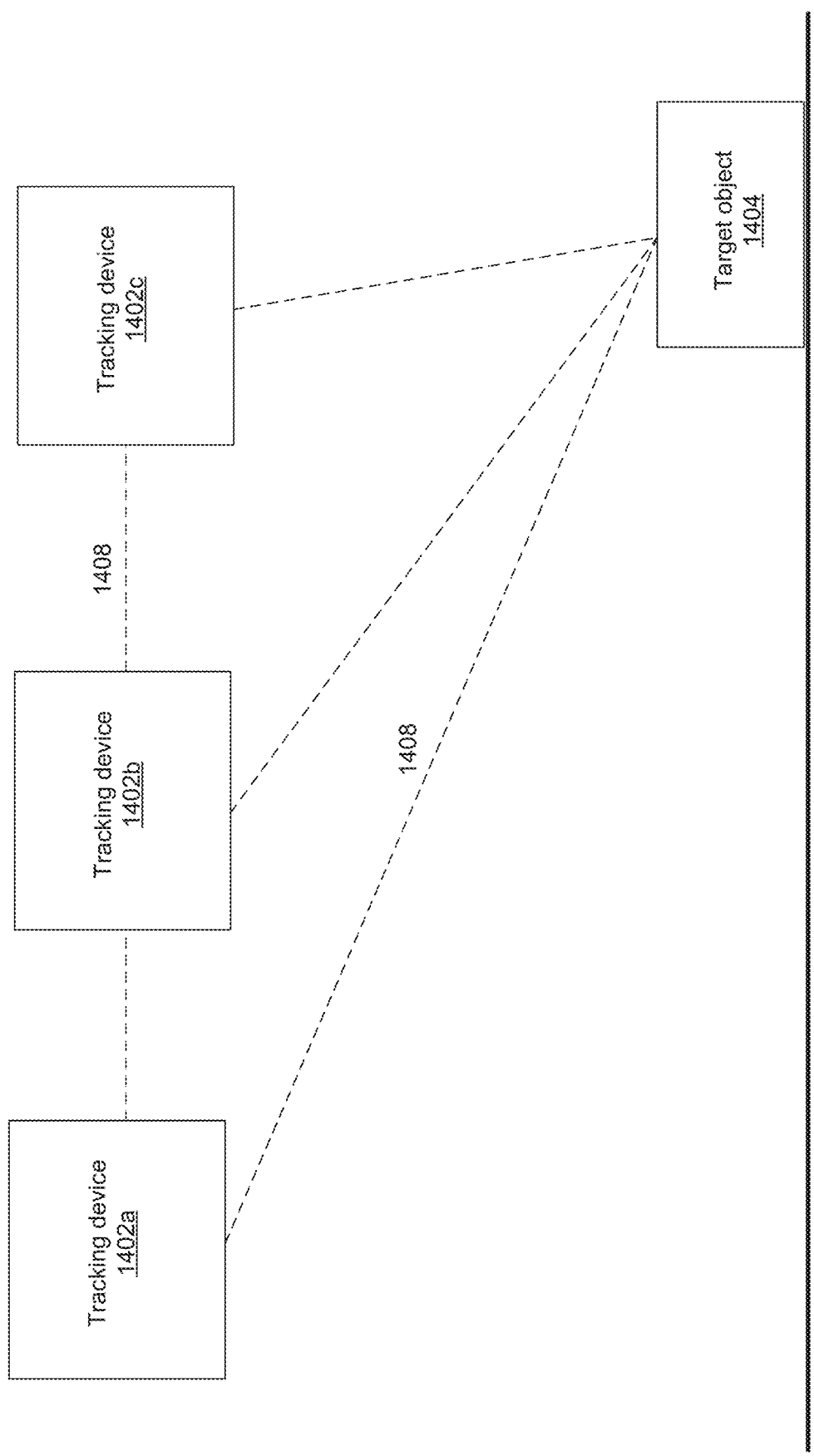
FIG. 14 illustrates the tracking of a target object using a plurality of tracking devices, in accordance with some embodiments.

FIG. 14 illustrates the tracking of the target object using the plurality of tracking devices, in accordance with some embodiments. The plurality of tracking devices may be used to simultaneously track the target object. The tracking devices may have the same positional goal or may have different positional goals. The tracking devices and/or an RPD module may be aware of relative locations between the tracking devices. This may aid in collective positioning of a plurality of tracking devices relative to the target object. For instance, depending on the number of tracking devices, different positional goals may be set for the tracking devices relative to the tracking object. Also, tracking relative positions between the tracking devices may permit collision avoidance between the tracking devices. Having the relative positions of the tracking devices to a high degree of accuracy and/or precision may permit the tracking devices to be operated in close proximity to one another with reduced concern of collision. For example, the tracking devices may be spaced apart from each other with less than a 1 m gap between. In some instances, the gap may be less than 90 cm, 80 cm, 70 cm, 60 cm, 50 cm, 40 cm, 30 cm, 20 cm, 10 cm, 5 cm, or 1 cm. Referring to FIGS. 13 and 14, the RPD module(s) can determine the corrected relative positions 1408 between the tracking devices 1402a, 1402b, and 1402c, and the target object 1404.

In some embodiments, the relative positions between the tracking devices and the target object may change with time. For example, FIG. 15 illustrates a spatial configuration between the tracking devices and the target object, whereby the spatial configuration is different from the one shown in FIG. 14. Referring to FIGS. 13 and 15, the RPD module(s) can determine the corrected relative positions 1508 between the tracking devices 1502a, 1502b, and 1502c, and the target object 1504, even as the spatial configuration of those components changes.

In some embodiments, the RPD module can determine the corrected relative positions dynamically as the tracking devices and the target object move from a first spatial configuration to a second spatial configuration. FIG. 16 illustrates the tracking of the target object 1604 using the plurality of tracking devices 1602a, 1602b, and 1602c, as the devices and the object move from a first spatial configuration to a second spatial configuration. The tracking devices may be located at different vertical elevations. Referring to FIGS. 13 and 16, the RPD module(s) can dynamically determine the corrected relative positions 1608 between the tracking devices 1602a, 1602b, and 1602c, and the target object 1604, as the devices and the object move from the first spatial configuration on the left of FIG. 16 to the second spatial configuration on the right of FIG. 16. In some embodiments, the RPD module(s) can determine the corrected locations of the plurality of tracking devices such that the tracking devices move in a predetermined formation relative to the target object. In some embodiments, the RPD module(s) can determine the corrected locations of the tracking devices such that the tracking devices follow a plurality of predetermined trajectories that are defined relative to the target object.

In the embodiments of FIGS. 14, 15, and 16, the RPD module(s) can determine the corrected locations of the tracking devices based on: (1) the estimated locations of each tracking device, and (2) the correction measurement. The RPD module(s) can also determine the corrected location of the target object based on: (1) the estimated location of the target object, and (2) the correction measurement. The RPD module(s) can further determine/control the positions of the tracking devices and/or the target object based on the corrected location of the target object and the corrected locations of the tracking devices, such that the tracking devices and the target object are positioned relative to each other to achieve a positional goal. For example, the RPD module(s) can determine the positions of the tracking devices such that the tracking devices move in a predetermined formation relative to one another. In some instances, the RPD module(s) can determine the positions of the tracking devices such that the tracking devices follow a plurality of predetermined trajectories. Alternatively, the RPD module(s) can determine the positions of the tracking devices such that the tracking devices move in a predetermined formation relative to the target object. The positions of the tracking devices may be determined such that the tracking devices follow a plurality of predetermined trajectories that are defined relative to the target object.

In the embodiments of FIGS. 14, 15, and 16, a relay or a peer-to-peer protocol can be used to communicate positioning information among the plurality of movable objects. A peer-to-peer (P2P) protocol is a distributed application architecture (a type of network) that partitions tasks or workloads between peers. Peers may be equally privileged, equipotent participants in the application. In the examples of FIGS. 14, 15, and 16, the plurality of tracking devices may be peers, and may be described as forming a peer-to-peer network of nodes, as shown by the interconnected dotted lines. The plurality of tracking devices may communicate with one another to perform a task (for example, tracking of the target object). Each tracking device may communicate its real-time position to the other tracking devices. Accordingly, even if an obstacle were to be present and blocking signal communication between the target object and a particular tracking device, the tracking device can still indirectly track the target object with high accuracy, by receiving real-time positional information of the target object from other tracking devices, and by calibrating its own position with the positions of the other tracking devices.

Figure 17:
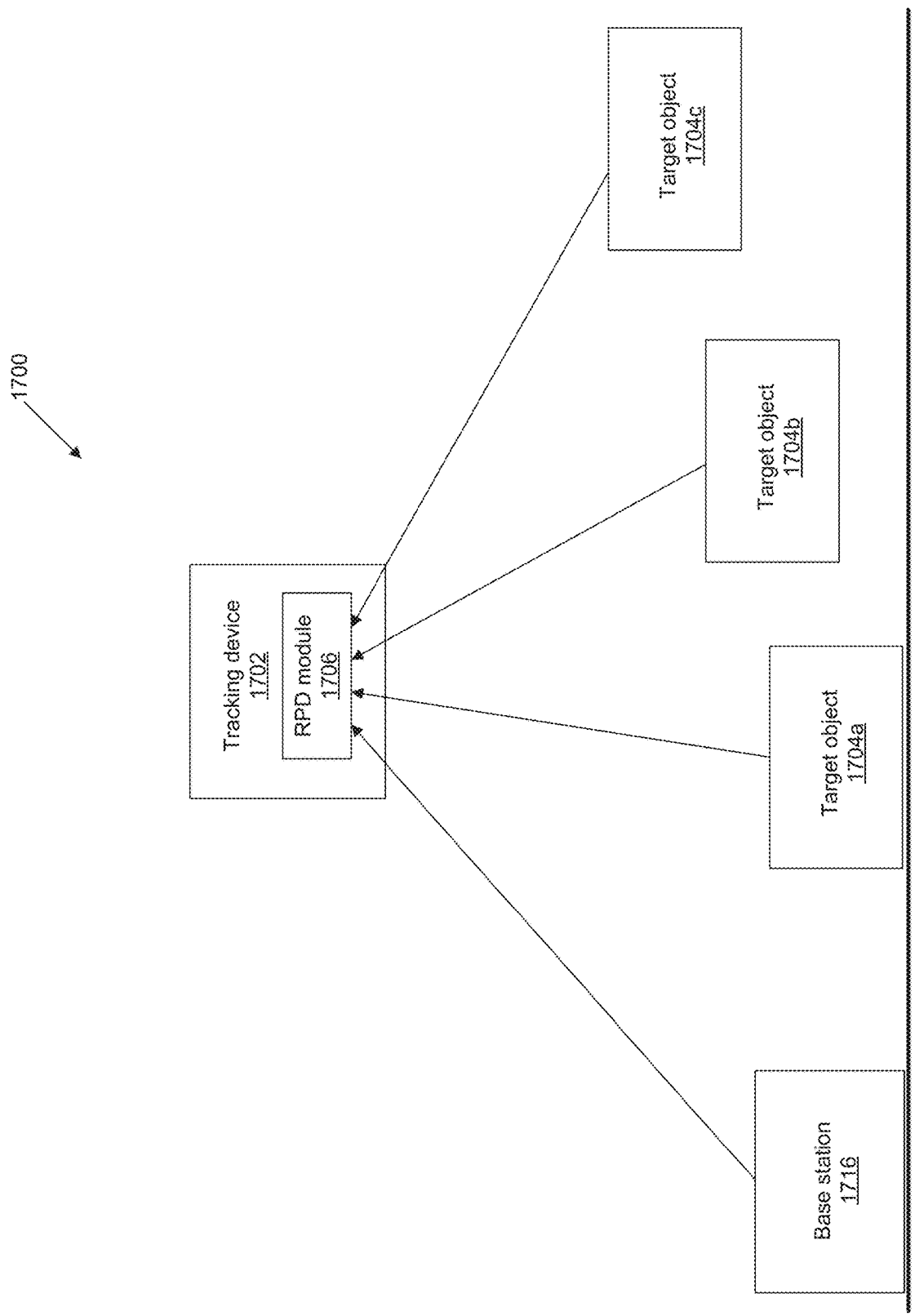
FIG. 17 illustrates a positioning system for determining the corrected relative positions between a tracking device and a plurality of target objects, in accordance with some embodiments.

In some embodiments, the target objects may be provided in plural. FIG. 17 illustrates a positioning system 1700 for determining the corrected relative positions between a tracking device and a plurality of target objects, in accordance with some embodiments. Referring to FIG. 17, the system comprises a tracking device 1702a, a plurality of target objects 1704a, 1704b, and 1704c, and a base station 1716. The tracking device 1702 may include the RPD module 1706. In some instances, the RPD module 1706 may be included in each of the target objects, and/or the base station. In some instances, the RPD module(s) may be located remotely from the tracking device, the target objects, and the base station.

Figure 19:
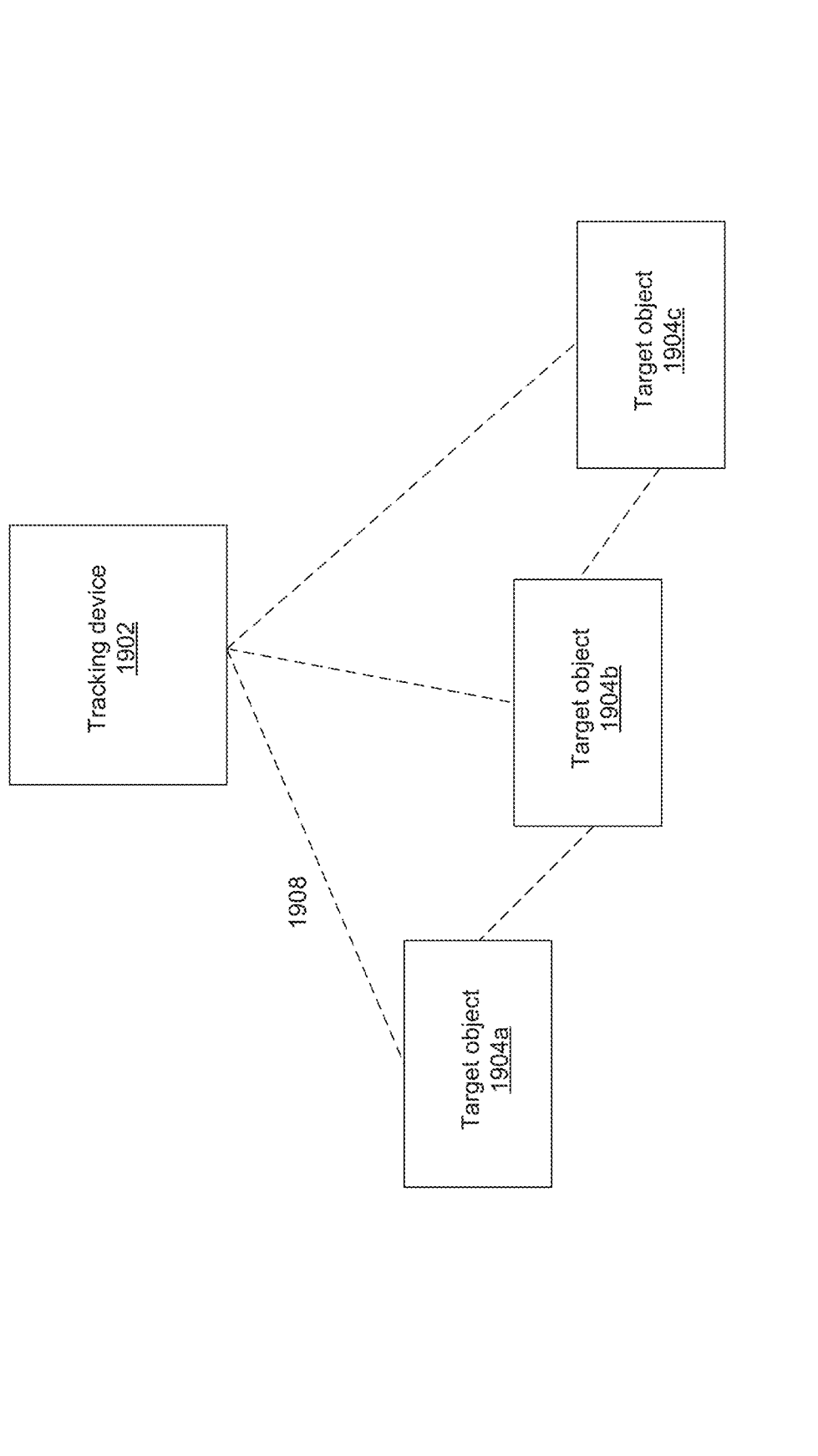
FIG. 19 illustrates the tracking of a plurality of target objects using a tracking device, in accordance with some further embodiments.
Figure 20:
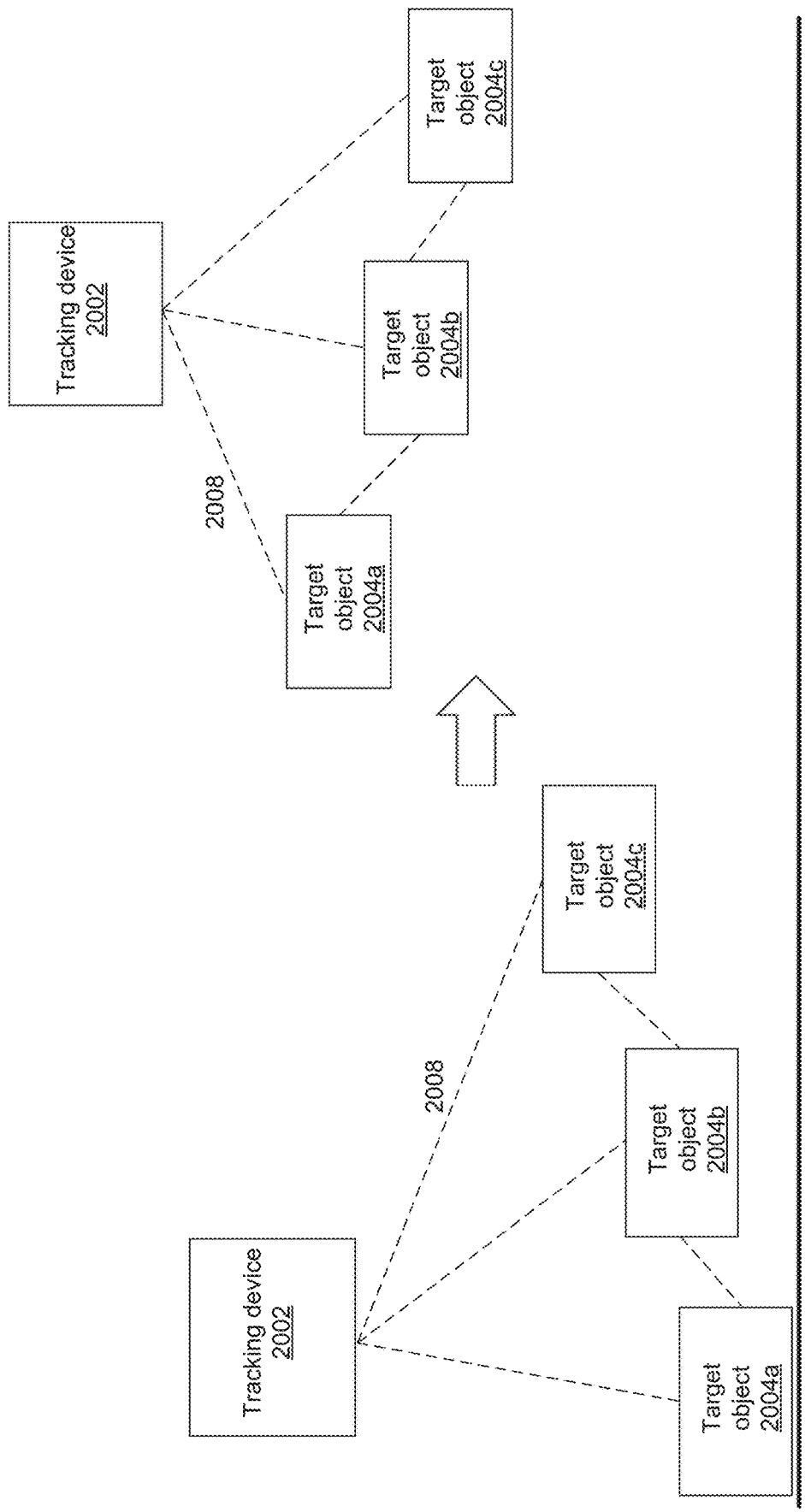
FIG. 20 illustrates the tracking of a plurality of movable target objects using a mobile tracking device as the device and the objects move from a first position to a second position, in accordance with some embodiments.

Referring to FIG. 17, the RPD module 1706 may receive a signal from each target object and the correction measurement from the base station. The signals may contain information about the estimated locations of the target objects. In some instances, the target objects may be in communication with one another. For example, each target object may receive the estimated locations of the other target objects, and/or corrected locations of the other target objects. The RPD module can be used to determine the corrected relative positions between the tracking device and the plurality of target objects, as illustrated in FIGS. 18, 19, and 20.

Figure 18:
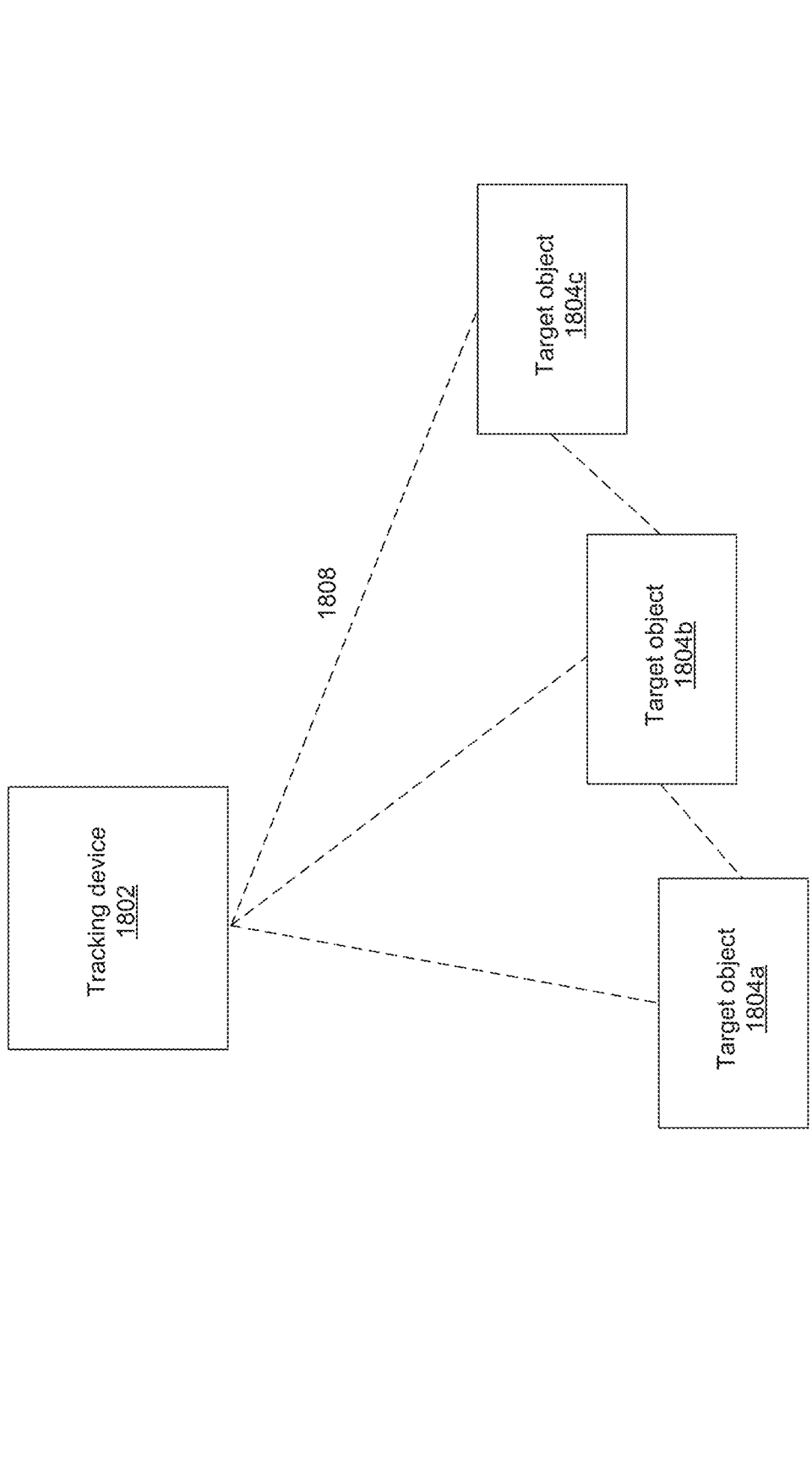
FIG. 18 illustrates the tracking of a plurality of target objects using a tracking device, in accordance with some embodiments.

FIG. 18 illustrates the tracking of the plurality of target objects using the tracking device, in accordance with some embodiments. Referring to FIGS. 17 and 18, the RPD module can determine the corrected relative positions 1808 between the tracking device 1802, and the plurality of target objects 1804a, 1804b, and 1804c.

In some embodiments, the relative positions between the tracking device and the target objects may change with time. For example, FIG. 19 illustrates a spatial configuration between the tracking device and the target objects, whereby the spatial configuration is different from the one shown in FIG. 18. Referring to FIGS. 17 and 19, the RPD module can determine the corrected relative positions 1908 between the tracking device 1902a and the plurality of target objects 1904a, 1904b, and 1904c, even as the spatial configuration of those components changes.

In some embodiments, the RPD module can determine the corrected relative positions dynamically as the tracking device and the target objects move from a first spatial configuration to a second spatial configuration. FIG. 20 illustrates the tracking of the plurality of target objects 2004a, 2004b, and 2004c using the tracking device 2002, as the device and the objects move from a first spatial configuration to a second spatial configuration. Referring to FIGS. 17 and 20, the RPD module can dynamically determine the corrected relative positions 2008 between the tracking device 2002 and the plurality of target objects 2004a, 2004b, and 2004c, as the device and the objects move from the first spatial configuration on the left of FIG. 20 to the second spatial configuration on the right of FIG. 20. In some embodiments, the RPD module can determine the corrected positions of the tracking device such that the tracking device moves in a predetermined formation relative to the target objects. In some embodiments, the RPD module can determine the corrected positions of the tracking device such that the tracking device follows a plurality of predetermined trajectories that are defined relative to the plurality of target objects.

In the embodiments of FIGS. 18, 19, and 20, the RPD module can determine the corrected locations of the target objects based on: (1) the estimated locations of each target object, and (2) the correction measurement. The RPD module can also determine the corrected location of each target object based on: (1) the estimated location of each target object, and (2) the correction measurement. The RPD module can further determine/control the positions of the tracking device and/or the target objects based on the corrected location of the target objects and the corrected location of the tracking device, such that the tracking device and the target objects are positioned relative to each other to achieve a positional goal. For example, the RPD module can determine the positions of the tracking device and the target object such that the tracking device and the target objects move in a predetermined formation relative to one another. In some instances, the RPD module can determine the positions of the tracking device such that the tracking device follows a plurality of predetermined trajectories. Alternatively, the RPD module can determine the positions of the tracking device such that the tracking device moves in a predetermined formation relative to the target objects. The positions of the tracking device may be determined such that the tracking device follows a plurality of predetermined trajectories that are defined relative to the target objects.

In the embodiments of FIGS. 18, 19, and 20, a relay or a peer-to-peer protocol can be used to communicate positioning information among the plurality of movable objects. A peer-to-peer (P2P) protocol is a distributed application architecture (a type of network) that partitions tasks or workloads between peers. Peers may be equally privileged, equipotent participants in the application. In the examples of FIGS. 18, 19, and 20, the plurality of target objects may be peers, and may be described as forming a peer-to-peer network of nodes, as shown by the interconnected dotted lines. The plurality of target objects may be in communication with one another. Each target object may communicate its real-time position to the other target objects. Accordingly, even if an obstacle were to be present and blocking signal communication between the tracking device and a particular target object, the tracking device can still indirectly track that target object with high accuracy, by receiving real-time positional information of that target object from other target objects.

Figure 21:
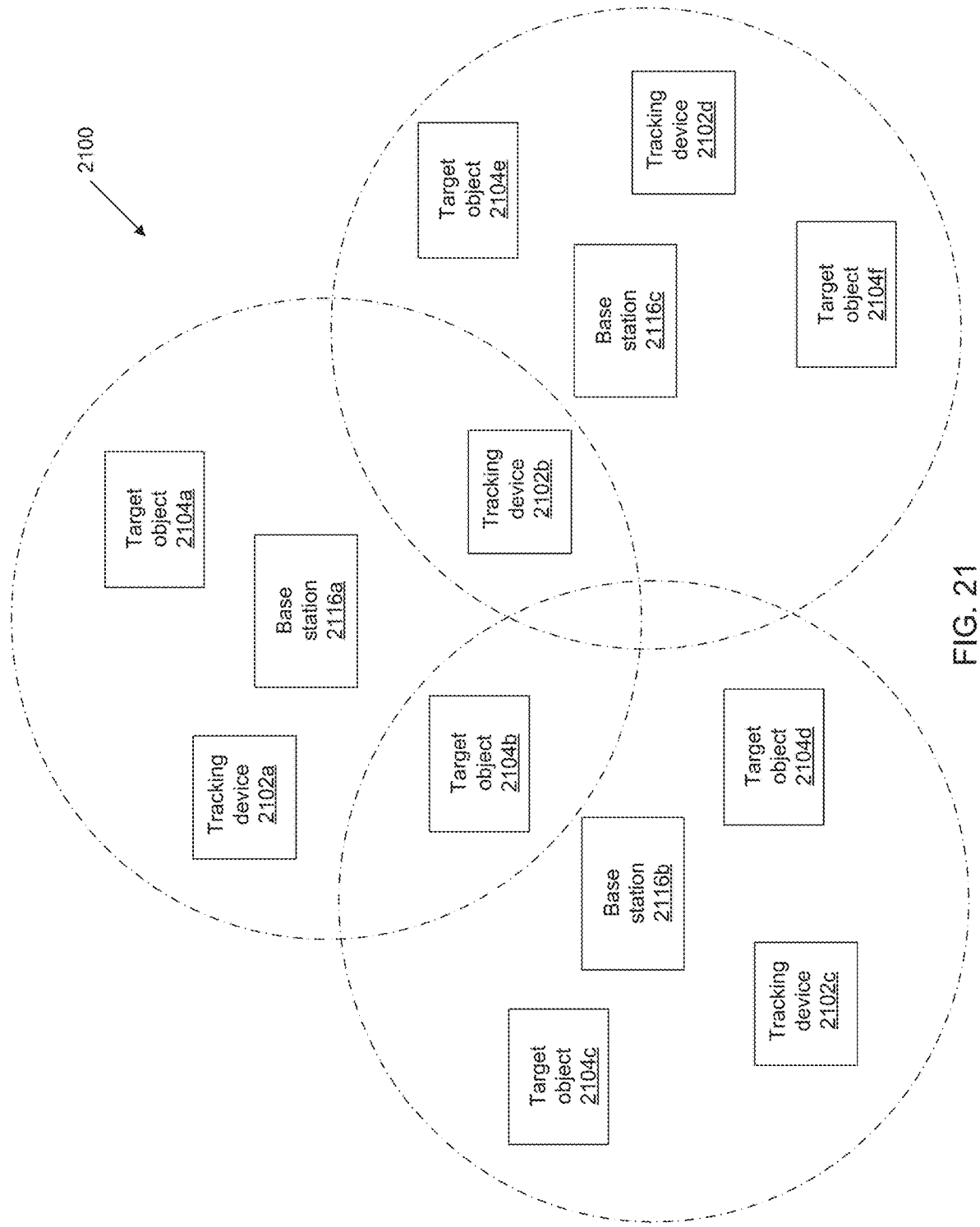
FIG. 21 illustrates a network positioning system comprising a plurality of tracking devices, a plurality of target objects, and a plurality of base stations, in accordance with some embodiments.

In some embodiments, the positioning module may be further configured to receive a plurality of correction measurements made at a plurality of base stations having different known locations. FIG. 21 illustrates a networked positioning system 2100 comprising the plurality of tracking devices 2102, the plurality of target objects 2104, and the plurality of base stations 2116, in accordance with some embodiments. The tracking devices, target objects, and base stations may be similar those previously described with reference to FIGS. 1 through 20. The plurality of base stations may be connected together in a network. In some embodiments, the network may be a RTK network. For example, the network may be configured using Wide-Area Real-Time Kinematics (WARTK). One or more RPD modules may be configured to determine the corrected relative positions between the tracking devices and the target objects. The RPD module(s) can also determine the corrected locations of the tracking devices and the target objects based on the correction measurements from the base stations. In some embodiments, a distance between adjacent base stations may range from about 30 km to about 35 km. In some embodiments, the distance between adjacent base stations may be less than 30 km, 25 km, 20 km, 15 km, 10 km, or 5 km. In some other embodiments, the distance between adjacent base stations may be greater than 35 km, 40 km, 45 km, 50 km, 60 km, 70 km, 80 km, or 100 km. The range of the correction measurement signal transmission from each base station may have a circular radius of about 20 km, less than 20 km, or greater than 20 km. The RPD module(s) can determine the positions of at least one tracking device and at least one target object to achieve a positional goal. For example, the RPD module may be configured to position at least one tracking device relative to at least one target object.

In some embodiments, not all of the base stations need to be used for the correction measurement. For example, in some instances, a redundancy could be built in to increase accuracy, or in case one or more base stations stops functioning. The tracking devices and target objects may use the correction measurement from the base stations that are closest to them. In some embodiments, the correction measurements may be obtained from multiple base stations, and then weighted based on their proximity to the tracking devices and/or the target objects, as well as other factors such as signal integrity of the correction measurements.

In some embodiments, an exemplary RPD module can determine the formation, alignment, or collaboration of at least one tracking device and at least one target object, in accordance with some embodiments. The RPD module may be configured to determine the positions of the tracking device(s) and/or the target object(s) in real-time to achieve a positioning tolerance level. In some embodiments, a relay or a peer-to-peer protocol may be used to communicate positioning information among a plurality of movable objects (comprising of the tracking device and target object).

Figure 22:
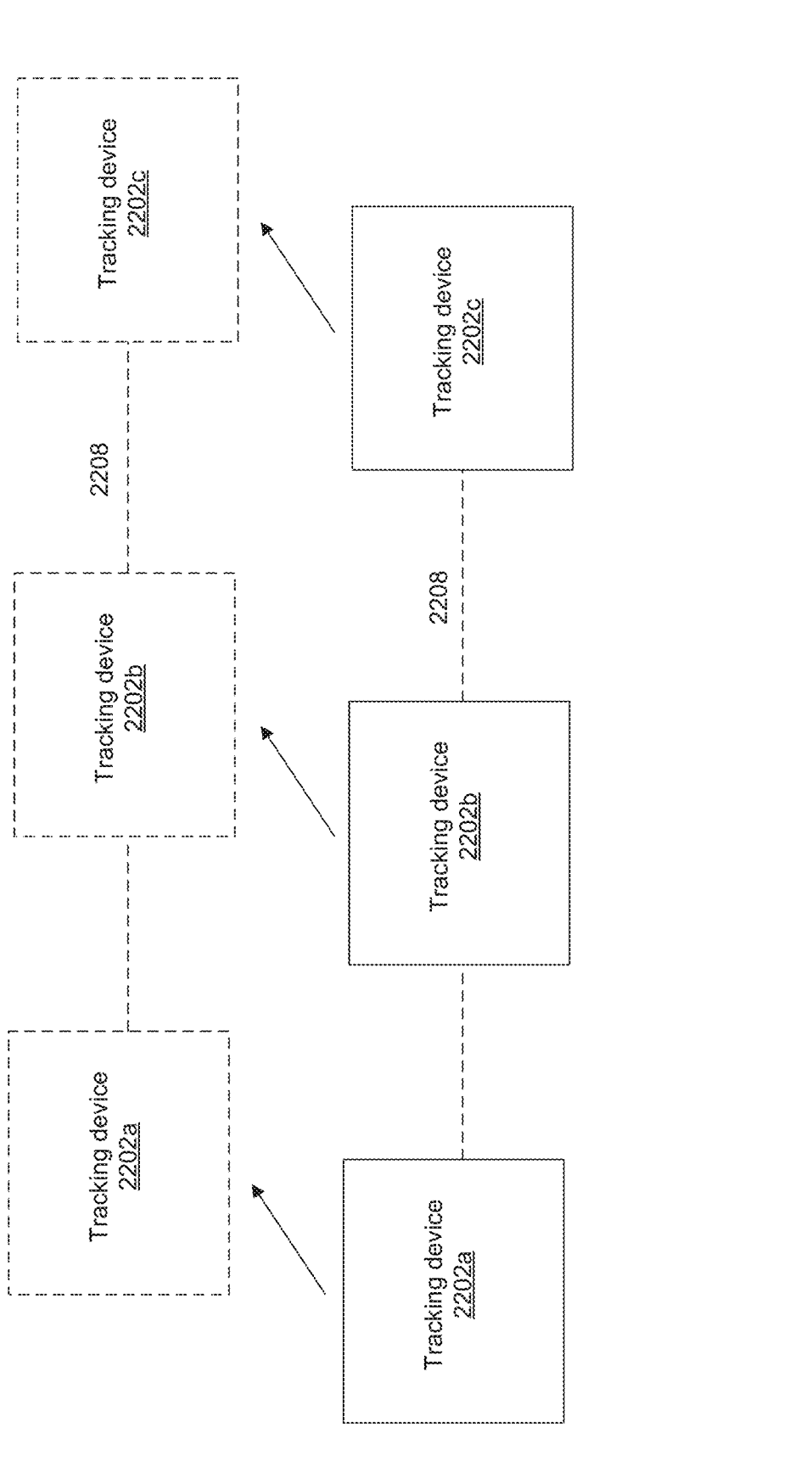
FIG. 22 illustrates the tracking or alignment of a plurality of mobile tracking devices based on their corrected relative positions, in accordance with some embodiments.

FIG. 22 illustrates the tracking or alignment of a plurality of tracking devices 2202 based on their corrected relative positions, in accordance with some embodiments. In the example of FIG. 22, an RPD module can control movement of the tracking devices 2202a, 2202b, and 2202c, such that the tracking devices move in a parallel formation. The movement of the tracking devices may be controlled based on their corrected relative positions 2208.

Figure 23:
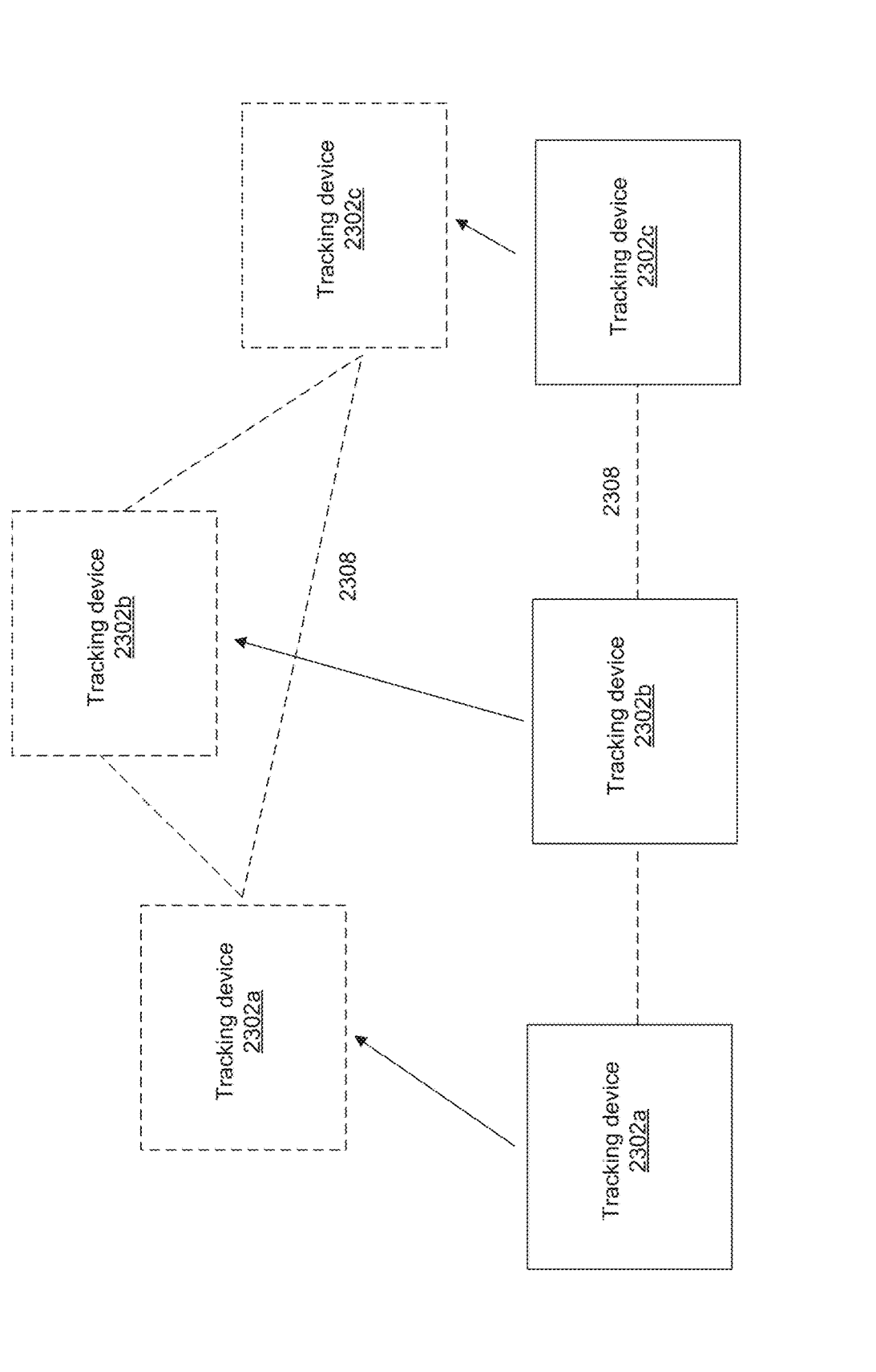
FIG. 23 illustrates the tracking or alignment of a plurality of mobile tracking devices based on their corrected relative positions, in accordance with some embodiments.

FIG. 23 illustrates the tracking or alignment of a plurality of tracking devices 2302 based on their corrected relative positions, in accordance with some embodiments. In the example of FIG. 23, an RPD module can control movement of the tracking devices 2302a, 2302b, and 2302c, such that the tracking devices move from a parallel formation to a non-parallel formation. The movement of the tracking devices may be controlled based on their corrected relative positions 2308.

In the embodiments of FIGS. 22 and 23, the RPD module can position or align the tracking devices relative to one another. The RPD module can obtain an estimated location of each tracking device, and determine the corrected relative positions between the tracking devices based on their estimated locations and the correction measurement. The correction measurement may be made based on an estimated location of a base station and a known location of the base station. The estimated locations of the tracking devices and the base station may be obtained from GNSS signals. The known location of the base station may be an accurately surveyed location having a set of known global spatial coordinates. The correction measurement may be a difference between the estimated location of the base station and the known location of the base station. The corrected relative positions between the tracking devices may be determined with reference to the known location of the base station.

The corrected relative positions between the tracking devices may be determined to achieve a positional goal between the tracking devices. The positional goal may include a predetermined distance between the tracking devices. The positional goal may include a predetermined attitude and/or orientation of the tracking devices relative to one another. The corrected relative positions between the tracking devices may be determined such that tracking devices move in a predetermined formation. For example, the tracking devices may be aligned relative to one another in the predetermined formation.

The tracking devices may follow a plurality of predetermined trajectories when moving in the predetermined formation. The plurality of predetermined trajectories may comprise a plurality of spatial points. Each spatial point may have a set of known global spatial coordinates. The plurality of tracking devices may travel through the corresponding plurality of spatial points at substantially a same time. The plurality of tracking devices may travel through the corresponding plurality of spatial points at different times.

In some embodiments, the RPD module can determine the formation, alignment, or collaboration of the tracking devices such that the tracking devices sequentially travel through a same spatial point. The spatial point may have a set of known global spatial coordinates. For example, FIGS. 24 and 25 illustrate the controlled movement of a plurality of tracking devices based on their corrected relative positions, in accordance with some embodiments.

Figure 24:
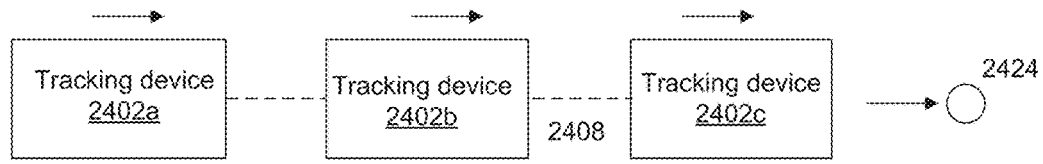
FIG. 24 illustrates the controlled movement of a plurality of mobile tracking devices based on their corrected relative positions, in accordance with some embodiments.

Referring to FIG. 24, the tracking devices 2402a, 2402b, and 2402c may sequentially travel in a straight line or a plane through a spatial point 2424. Referring to FIG. 25, the tracking devices 2502a, 2502b, and 2502c may sequentially travel through a spatial point 2524 from different elevations and at different directions. In the examples of FIGS. 24 and 25, the tracking devices may be controlled by the RPD module to sequentially travel through the spatial point at a predetermined frequency. The tracking devices may sequentially travel through the spatial point with predetermined time interval separations between adjacent tracking devices.

For example, referring to FIG. 24, the tracking device 2402a may travel through the spatial point at time t1, the tracking device 2402b may travel through the spatial point at time t2, and the tracking device 2402c may travel through the spatial point at time t3. The tracking devices 2402a, 2402b, and 2402c may sequentially travel in a straight line or a plane. Time t2 may be a point in time occurring after time t1, and time t3 may be a point in time occurring after time t2. The predetermined time interval separation between the tracking device 2402a and the tracking device 2402b may be determined by t12=t2−t1. The predetermined time interval separation between the tracking device 2402b and the tracking device 2402c may be determined by t23=t3−t2. The predetermined time interval separations between adjacent tracking devices may be substantially the same such that t12=t23. In some embodiments, the predetermined time interval separations between adjacent tracking devices may be substantially different. For example, t12 may be substantially less than t23 in some embodiments, and t12 may be substantially greater than t23 in other embodiments.

Figure 25:
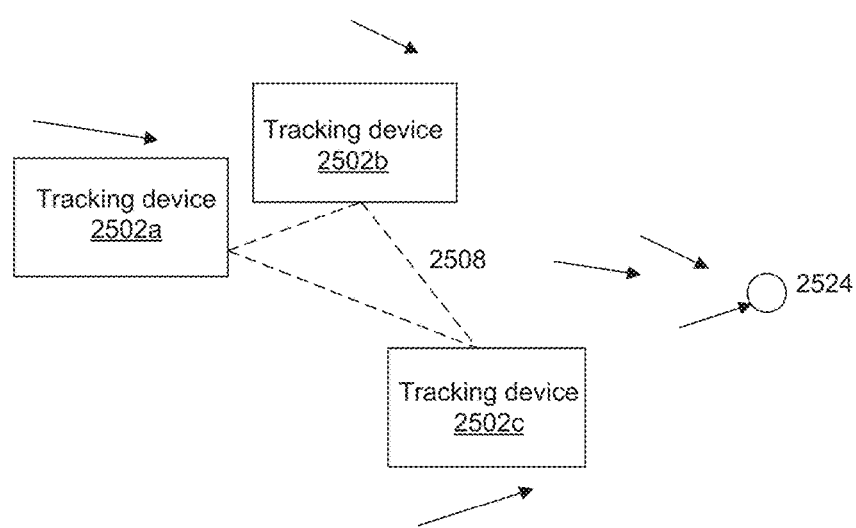
FIG. 25 illustrates the controlled movement of a plurality of mobile tracking devices based on their corrected relative positions, in accordance with some embodiments.

Referring to FIG. 25, the tracking device 2502a may travel through a spatial point 2524 at time t1, the tracking device 2502b may travel through the spatial point at time t2, and the tracking device 2502c may travel through the spatial point at time t3. Time t2 may be a point in time occurring after time t1, and time t3 may be a point in time occurring after time t2. The predetermined time interval separation between the tracking device 2502a and the tracking device 2502b may be determined by t12=t2−t1. The predetermined time interval separation between the tracking device 2502b and the tracking device 2502c may be determined by t23=t3−t2. The predetermined time interval separations between adjacent tracking devices may be substantially the same such that t12=t23. In some embodiments, the predetermined time interval separations between adjacent tracking devices may be substantially different. For example, t12 may be substantially less than t23 in some embodiments, and t12 may be substantially greater than t23 in other embodiments.

Unlike the embodiment of FIG. 24, the tracking devices 2502a, 2502b, and 2502c in FIG. 25 may sequentially arrive at the spatial point 2524 from different angles and/or elevations. For example, the tracking device 2502a may be located at a higher elevation than spatial point and arrive at a first angle relative to the spatial point; the tracking device 2502b may be located at a higher elevation than the tracking device 2502a and arrive at a second angle relative to the spatial point; and the tracking device 2502b may be located at a lower elevation than the spatial point and arrive at a third angle relative to the spatial point.

In the embodiments of FIGS. 13 through 25, the tracking device(s) and/or the target object(s) may be in communication with one another via a mesh network. In some embodiments, one or more base stations may be further included in the mesh network. In some embodiments, the tracking device(s), the target object(s), and/or base station(s) may communicate their known locations, estimated positions, corrected instantaneous positions, corrected relative positions, one or more correction measurements, or one or more positional goals, to one another over the mesh network, in real-time or near real-time, and at fixed or variable intervals. Based on the data communicated over the mesh network, the tracking device(s) and/or the target object(s) can adjust their motion characteristics in order to achieve the one or more positional goals.

Each tracking device, target object, or base station may be represented individually by a node in the mesh network. The nodes are interconnected with other nodes in the mesh network so that multiple pathways connect each node. Connections between nodes can be dynamically updated and optimized using built-in mesh routing tables. Mesh networks may be decentralized in nature, and each node may be capable of self-discovery on the network. Also, as nodes leave the network, the mesh topology allows the nodes to reconfigure routing paths based on the new network structure. The characteristics of mesh topology and ad-hoc routing provide greater stability in changing conditions or failure at single nodes. For example, when one or more tracking devices and/or target objects leave the network, the remaining tracking devices and/or target objects can reconfigure new routing paths (or physical flight/motion paths) based on the new network structure. In some embodiments, the network may be a full mesh network where all of the devices/objects are meshed and in communication with one another. In other embodiments, the network may be a partial mesh network where only some of the devices/objects are meshed and in communication with one another.

The mesh network may be supported by a wireless protocol that can enable broad-based deployment of wireless networks with low-cost, low-power solutions. The protocol may allow communication of data through various radio frequency (RF) environments in both commercial and industrial applications. The protocol can allow devices (e.g., tracking devices, target objects, and/or base stations) to communicate in a variety of network topologies. The protocol may include features such as: (1) support for multiple network topologies such as point-to-point; (2) point-to-multipoint and mesh networks; (3) low duty cycle to extend battery life; (4) low latency for lower power consumption; (5) Direct Sequence Spread Spectrum (DSSS); (6) up to 65,000 nodes per network; (7) 128-bit AES encryption for secure data connections; and (8) collision avoidance and retries. The low duty cycle can enable the tracking devices to track the target objects for a longer period of time, since less power is consumed during the low duty cycle. The high number of nodes (up to 65,000 nodes) allowable in the network can enable a large number of tracking devices, target objects, and/or base stations to be connected and controlled within the mesh network. The collision avoidance and retries capability can help to prevent collisions between the tracking devices and/or target objects as the tracking devices and/or target objects move over different terrain, and as different devices/objects drop in or out of the mesh network (e.g., due to poor signal transmission quality, obstacles blocking signal transmission, powering off of radio transmitters in the devices/objects, etc.).

In some instances, the protocol can provide an easy-to-use wireless data solution that is characterized by secure, reliable wireless network architectures. The protocol can be configured to meet the needs of low-cost, low-power wireless machine-to-machine (M2M) networks. Examples of machines may include the tracking devices, target objects, and/or base stations. The protocol may be configured to provide high data throughput in applications where the duty cycle is low and low power consumption is an important consideration. (For example, in some cases, some or all of the tracking devices and/or target objects may be powered by batteries, i.e. where low power consumption is desirable to increase flight time/distance or motion time/distance).

In some embodiments, transmission distances for the wireless protocol for the mesh network of devices/objects may range from about 10 meters to about 1500 meters line-of-sight (e.g., 10 m, 20 m, 30 m, 40 m, 50 m, 100 m, 200 m, 300 m, 500 m, 800 m, 1000 m, 1200 m, or 1500 m). For indoor applications at 2.4 GHz, transmission distances may range from about 10 m to about 20 m, depending on the construction materials, the number of walls to be penetrated and the output power permitted in that geographical location. Conversely, for outdoor applications with line-of-sight, transmission distance may be up to about 1500 m depending on power output and environmental characteristics. In some alternative embodiments, transmission distances for the wireless protocol for the mesh network of devices/objects may be less than about 10 m (e.g., 9 m, 7 m, 5 m, 3 m, 1 m, or less than 1 m). In some further embodiments, transmission distances for the wireless protocol for the mesh network of devices/objects may be greater than about 1500 m (e.g., 1600 m, 1700 m, 1800 m, 1900 m, 2000 m, 3000 m, 5000 m, or greater than 5000 m).

In some embodiments, the protocol can be used to transmit data over long distances by passing data through a mesh network of intermediate devices (e.g., intermediate tracking devices and/or target objects) to reach more distant ones. The protocol may be used in low data rate applications that require long battery life and secure networking. In some embodiments, the mesh network may be secured by 128 bit symmetric encryption keys. In some embodiments, the protocol may have data transmission rates ranging from about 20 kbit/s (868 MHz band) to about 250 kbit/s (2.4 GHz band). In some embodiments, the protocol may have a defined rate of 250 kbit/s, that is suited for intermittent data transmissions from the tracking devices and/or the target objects. In some embodiments, the protocol may have data transmission rates ranging from less than about 20 kbit/s (e.g., 18 kbit/s, 16 kbit/s, 14 kbit/s, 12 kbit/s, 10 kbit/s, 5 kbit/s, or less than 5 kbit/s). In other embodiments, the protocol may have data transmission rates ranging from more than about 250 kbit/s (e.g., 260 kbit/s, 270 kbit/s, 280 kbit/s, 290 kbit/s, 300 kbit/s, 350 kbit/s, 400 kbit/s 500 kbit/s, or more than 500 kbit/s). In some embodiments, the tracking devices and/or the target objects using the protocol have low latency, which reduces average current consumption.

In some embodiments, the wireless protocol for supporting the mesh network of tracking devices, target objects, and/or base stations may include the ZigBee standard. The ZigBee standard operates on the Institute of Electrical and Electronics Engineers (IEEE) 802.15.4 physical radio specification and operates in unlicensed bands including 2.4 GHz, 900 MHz and 868 MHz. The IEEE 802.15.4 specification is a packet-based radio protocol intended for low-cost, battery-operated devices. A ZigBee network layer can natively support both star and tree networks, and generic mesh networking. Each network may have one coordinator device, tasked with its creation, the control of its parameters and basic maintenance. Within star networks, the coordinator may be the central node. Both trees and meshes can allow the use of ZigBee routers to extend communication at the network level. ZigBee builds on the physical layer and media access control defined in IEEE standard 802.15.4 for low-rate WPANs. The specification includes four additional key components: network layer, application layer, ZigBee device objects (ZDOs) and manufacturer-defined application objects which allow for customization and favor total integration. ZDOs are responsible for a number of tasks, including keeping track of device roles, managing requests to join a network, as well as device discovery and security.

In some embodiments, the tracking devices, target objects, and base stations in the mesh network may be ZigBee devices. The ZigBee devices may comprise a ZigBee Coordinator (ZC), one or more ZigBee Routers (ZR), and/or one or more ZigBee End Devices (ZED).

The ZC serves as the root of the network tree and can form a bridge to other networks. Each mesh network may consist of one ZC. The ZC can store information about the network, and can be used to control the ZRs and the ZEDs. For example, in some embodiments, a base station may be the ZC. In some other embodiments, a tracking device may be the ZC. In some alternative embodiments, a target object may be the ZC. Any device/object/station may serve as the ZC, either continuously at all times, periodically at a fixed or variable frequency, or only for a specific time duration. In some embodiments, different tracking devices, target objects, and/or base stations may take turns serving as the ZC (for example, in a round robin like configuration).

The ZR can act as an intermediate router, passing on data from other devices. The ZED may contain sufficient functionality to communicate with the parent node (either the ZC or the ZR). The ZED may not be configured to relay data from other devices. This relationship allows the ZED to be asleep for a significant amount of the time, thereby allowing for long battery life which can enable extended flight/motion time. A ZED requires the least amount of memory, and therefore may be less expensive to manufacture than a ZR or ZC. In some embodiments, a particular base station may be selected as the ZC, and one or more other tracking devices/target objects/base stations may be selected as ZRs or ZEDs. In other embodiments, a particular tracking device may be selected as the ZC, and one or more other tracking devices/target objects/base stations may be selected as ZRs or ZEDs. In some further embodiments, a particular target object may be selected as the ZC, and one or more other tracking devices/target objects/base stations may be selected as ZRs or ZEDs. Any arrangements/roles/configurations of the tracking devices, target objects, and/or base stations in the ZigBee mesh network may be contemplated.

In some embodiments, the ZigBee protocol can support beacon networks and also non-beacon enabled networks. In non-beacon-enabled networks, an unslotted carrier sense multiple access with collision avoidance (CSMA/CA) channel access mechanism may be used. The CSMA/CA channel access mechanism is a network multiple access method in which carrier sensing is used, but nodes attempt to avoid collisions by transmitting only when the channel is sensed to be idle. When the nodes transmit data, they transmit their packet data in its entirety. In this type of network, the ZigBee Routers (ZRs) typically have their receivers continuously active, requiring a more robust power supply. This may allow for heterogeneous networks in which some devices receive continuously, while others only transmit when an external stimulus is detected.

In contrast, for beacon-enabled networks, the ZRs transmit periodic beacons to confirm their presence to other network nodes. Nodes may sleep between beacons, thus lowering their duty cycle and extending their battery life which can extend flight/motion time. Beacon intervals depend on data rate. For example, beacon intervals may range from about 15 milliseconds to about 251 seconds at about 250 kbit/s, from about 24 milliseconds to about 393 seconds at about 40 kbit/s, and from about 48 milliseconds to about 786 seconds at about 20 kbit/s.

Accordingly, the ZigBee protocols can minimize the time the radio is on, so as to reduce power use by the tracking devices, target objects, and base stations. In beaconing networks, nodes only need to be active while a beacon is being transmitted. In non-beacon-enabled networks, power consumption is decidedly asymmetrical (e.g., some devices are always active, while others spend most of their time in sleep mode).

Figure 26:
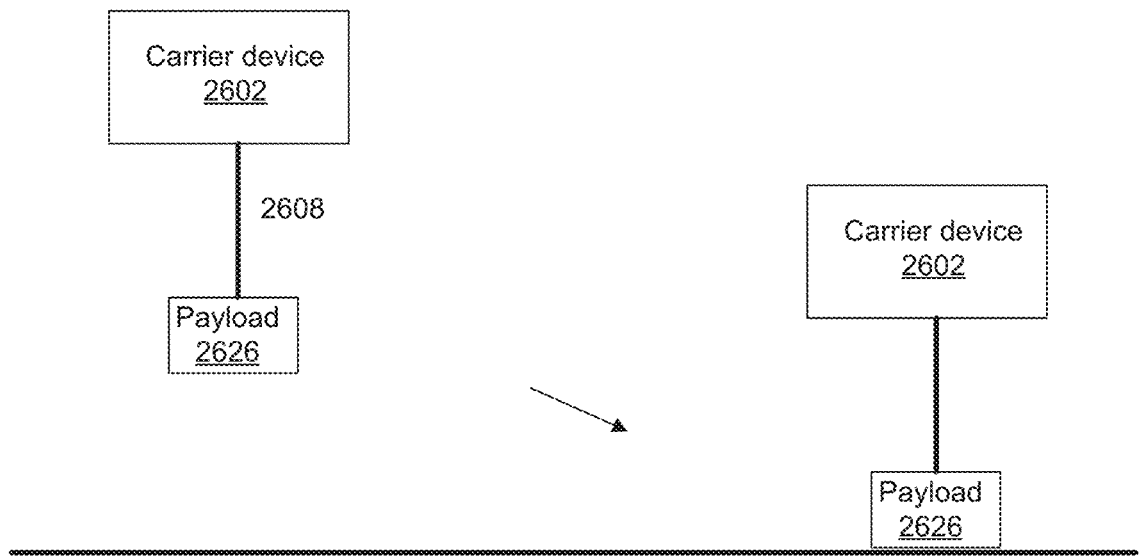
FIG. 26 illustrates the controlled delivery of a payload using a mobile carrier device based on their corrected relative position, in accordance with some embodiments.
Figure 27:
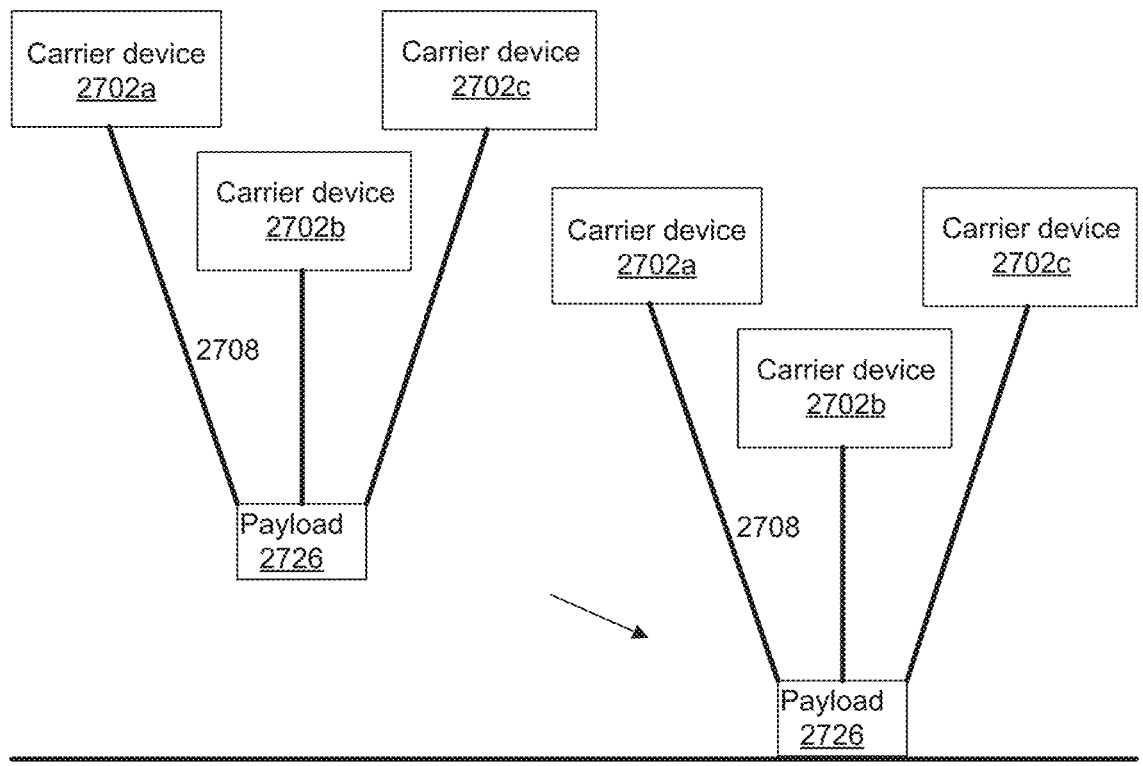
FIG. 27 illustrates the controlled delivery of a payload using a plurality of mobile carrier devices based on their corrected relative positions, in accordance with some embodiments.

In some embodiments, the RPD module can determine the corrected relative positions between a plurality of movable objects to enable the plurality of movable objects to collectively perform a task. The movable object may be a carrier device. The movable object may be a UAV. In some embodiments, the movable object can be configured to carry a load. For example, FIG. 26 illustrates the controlled movement of a load using a carrier device based on their corrected relative position, in accordance with some embodiments. FIG. 27 illustrates the controlled movement of a load using a plurality of carrier devices based on their corrected relative positions, in accordance with some embodiments. In the embodiments of FIGS. 26 and 27, the corrected relative positions between the carrier device(s) and the load may be determined based on: (1) the estimated locations of the carrier device(s) and the load, and (2) the correction measurement. The correction measurement may be made based on an estimated location of a base station and a known location of the base station. The estimated locations of the carrier devices, the load, and the base station may be obtained from GNSS signals. The known location of the base station may be an accurately surveyed location having a set of known global spatial coordinates. The correction measurement may be a difference between the estimated location of the base station and the known location of the base station. The corrected relative positions between the carrier devices and the load may be determined with reference to the known location of the base station.

Referring to FIG. 26, the load 2626 may be supported by a support mechanism attached to the carrier device 2602. In the example of FIG. 27, the load 2726 may be supported by a support mechanism attached to the plurality of carrier devices 2702a, 2702b, and 2702c. The support mechanism may comprise cables, stabilized platforms, nets, or any structure capable of a supporting a load. The task may comprise moving the load from one point to another point using the carrier devices based on the corrected relative positions 2608 and 2708.

The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier structure. The carrier structure can be provided for the payload and the payload can be coupled to the movable object via the carrier structure, either directly (e.g., directly contacting the movable object) or indirectly (e.g., not contacting the movable object). Conversely, the payload can be mounted on the movable object without requiring a carrier structure. The payload can be integrally formed with the carrier structure. Alternatively, the payload can be releasably coupled to the carrier structure. In some embodiments, the payload can include one or more payload elements, and one or more of the payload elements can be movable relative to the movable object and/or the carrier, as described above.

The carrier structure can provide support to the payload (e.g., carry at least part of the weight of the payload). The carrier structure can include a suitable mounting structure (e.g., a gimbal platform) capable of stabilizing and/or directing the movement of the payload. In some embodiments, the carrier structure can be adapted to control the state of the payload (e.g., position and/or orientation) relative to the movable object. For example, the carrier structure can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier structure can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some embodiments, the movement of the movable object, carrier structure, and payload relative to a fixed reference frame (e.g., the surrounding environment) and/or to each other, can be controlled by a terminal. The terminal may be a part of the RPD module. The terminal can be a remote control device at a location distant from the movable object, carrier structure, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier structure, and/or payload. For example, the terminal can be used to control the position and/or orientation of the movable object, carrier structure, and/or payload relative to a fixed reference from and/or to each other. In some embodiments, the terminal can be used to control individual elements of the movable object, carrier structure, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier structure, and/or payload. For example, the terminal can be configured to display information of the movable object, carrier structure, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Figure 28:
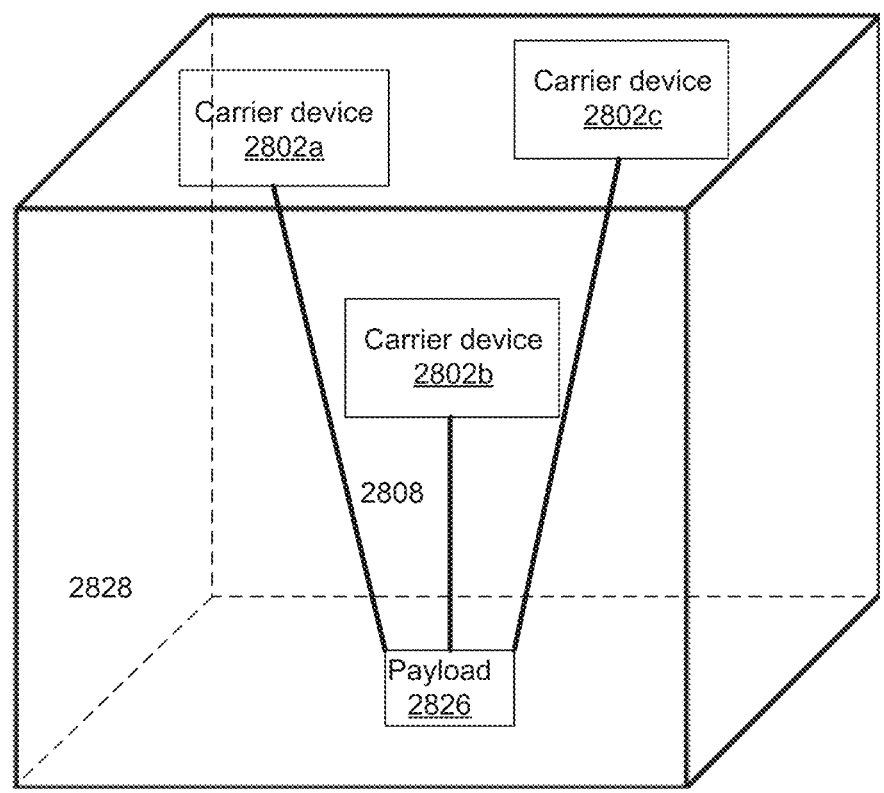
FIG. 28 illustrates the controlled movement of a payload in a regular-shaped confined space using a plurality of carrier devices, in accordance with some embodiments.
Figure 29:
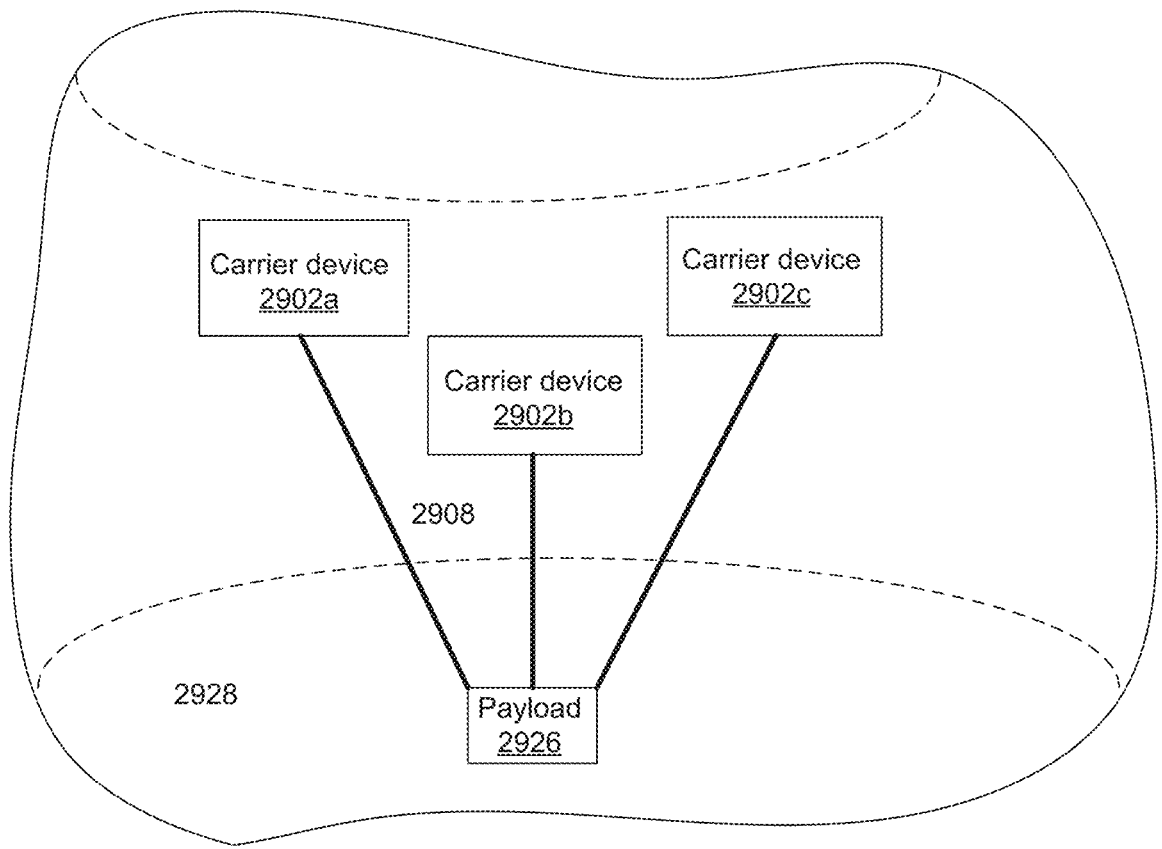
FIG. 29 illustrates the controlled movement of a payload in an irregular-shaped confined space using a plurality of mobile carrier devices, in accordance with some embodiments.

In some embodiments, the task may further comprise moving the load between different points within a limited space using the plurality of movable objects. The limited space may be constrained by physical terrain and structures comprising buildings. For example, FIG. 28 illustrates the controlled movement of a load in a regular-shaped confined space using a plurality of carrier devices, in accordance with some embodiments. FIG. 29 illustrates the controlled movement of a load in an irregular-shaped confined space using a plurality of carrier devices, in accordance with some embodiments. The movement of the load can be controlled based on the corrected relative positions between the carrier devices and the load.

In the embodiments of FIGS. 28 and 29, the corrected relative positions between the carrier device and the load may be determined based on: (1) the estimated locations of the carrier device and the load, and (2) the correction measurement. The correction measurement may be made based on an estimated location of a base station and a known location of the base station. The estimated locations of the carrier devices, the load, and the base station may be obtained from GNSS signals. The known location of the base station may be an accurately surveyed location having a set of known global spatial coordinates. The correction measurement may be a difference between the estimated location of the base station and the known location of the base station. The corrected relative positions between the carrier devices and the load may be determined with reference to the known location of the base station.

Referring to FIG. 28, the load 2826 may be supported by a support mechanism attached to a plurality of carrier devices 2802. In the example of FIG. 29, the load 2926 may be supported by a support mechanism attached to a plurality of carrier device 2902. The support mechanism may comprise cables, stabilized platforms, nets, or any structure capable of a supporting a load. The task may comprise moving the load from one point to another point within a confined space using the carrier devices based on the corrected relative positions 2808 and 2908. The confined space may be enclosed by a net, wires, poles, beams, or any type of enclosure structure that limit the space in which the carrier devices can maneuver. GPS signals and correction measurement signals may be transmitted to the carrier devices located within the confined space. In other words, the carrier devices may be capable of receiving GPS signals and correction measurement signals from the outside. Accordingly, the enclosure structure (e.g., net, wires, etc.) can allow GPS signals and correction measurement signals to pass through from the outside into the confined space.

In the example of FIG. 28, the RPD module may be configured to control the movement of the load 2826 in the regular-shaped space 2828. The regular-shaped space may be symmetrical, for example cubic. In some instances, a width of the space may range from less than 5 m, 6 m, 7 m, 8 m, 9 m, or 10 m. In other instances, the width of the space may be greater than 10 m.

In the example of FIG. 29, the RPD module may be configured to control the movement of the load 2926 in the irregular-shaped space 2928. The irregular-shaped space may have an amorphous shape without any symmetry.

As previously mentioned, the RPD module can determine the corrected relative positions between a plurality of movable objects to enable the plurality of movable objects to collectively perform a task. The movable objects may comprise tracking devices and/or target objects. In some embodiments, the task may comprise using the plurality of movable objects to collect data over an area. The data may comprise surveillance data or topographical mapping data. The task may comprise precision farming. Precision farming may comprise observing, measuring, and responding to inter and intra-field variability in crops grown over an area. The task may comprise performing different aerial maneuvers using the plurality of movable objects (for example, as shown in FIGS. 22, 23, 24, and 25).

In some embodiments, a user may be able to control one or more aspects of a positioning system of a UAV remotely using the RPD module. For instance, a user may be able to send a command that may affect movement of the movable objects in the positioning system. The user may be able to view a difference between the estimated locations and the corrected locations of the movable objects, for example on a user device.

Accordingly, a user can determine the corrected relative position and corrected locations of the movable objects with greater accuracy using one or more and/or different combinations of the embodiments described herein.

In other embodiments, positioning of the movable objects may occur without requiring any user input. For example, various spatial configurations may be automatically selected by one or more processors. For instance, the RPD module can determine optimal routes for the movable objects based on their corrected relative positions and corrected locations.

Figure 30:
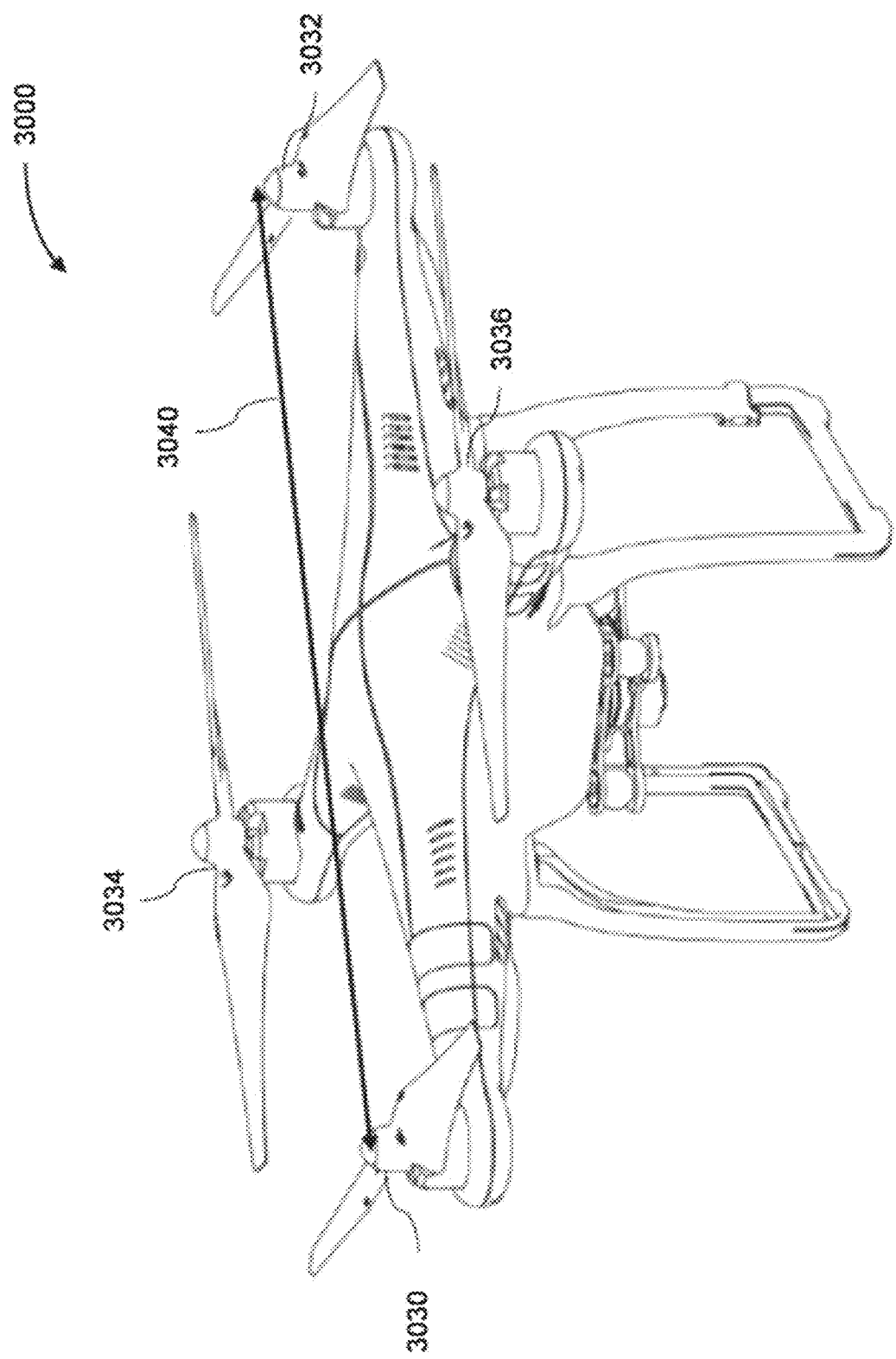
FIG. 30 illustrates an exemplary UAV, in accordance with some embodiments.

FIG. 30 illustrates an unmanned aerial vehicle (UAV) 3000, in accordance with embodiments of the present disclosure. The UAV may be an example of a movable object as described herein. The UAV 3000 can include a propulsion system having four rotors 3030, 3032, 3034, and 3036. Any number of rotors may be provided (e.g., one, two, three, four, five, six, or more). The rotors or other propulsion systems of the unmanned aerial vehicle may enable the unmanned aerial vehicle to hover/maintain position, change orientation, and/or change location. The distance between shafts of opposite rotors can be any suitable length 3040. For example, the length 3040 can be less than or equal to 2 m, or less than equal to 5 m. In some embodiments, the length 3040 can be within a range from 40 cm to 7 m, from 70 cm to 2 m, or from 5 cm to 5 m. Any description herein of a UAV may apply to a movable object, such as a movable object of a different type, and vice versa. In some embodiments, the movable object can be configured to carry a load, as previously described with reference to FIGS. 26, 27, 28, and 29.

Figure 31:
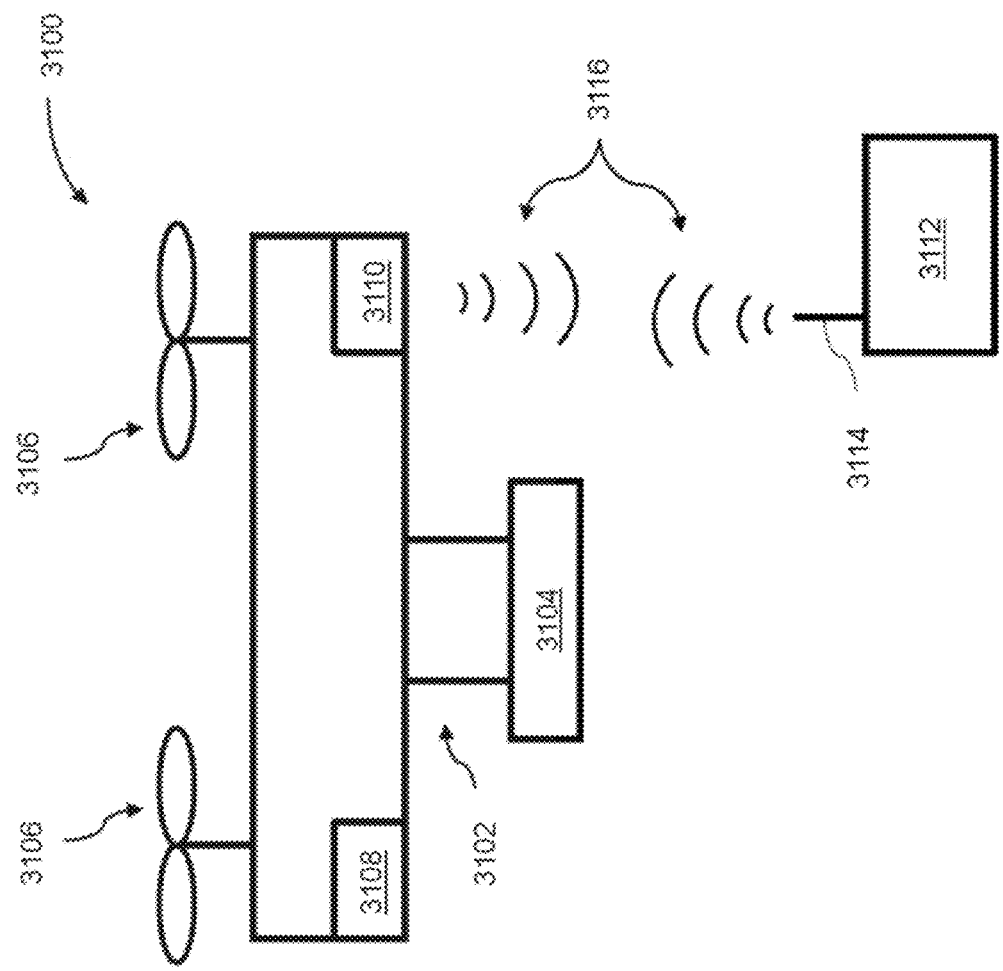
FIG. 31 is a schematic block diagram of a system for controlling a movable object, in accordance with some embodiments.

FIG. 31 illustrates a movable object 3100 including a carrier 3102 and a payload 3104, in accordance with embodiments. Although the movable object 3100 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., a UAV).

In some instances, the payload 3104 may be provided on the movable object 3100 without requiring the carrier 3102. The movable object 3100 may include propulsion mechanisms 3106, a sensing system 3108, and a communication system 3110. The propulsion mechanisms 3106 can include one or more of rotors, propellers, blades, engines, motors, wheels, axles, magnets, or nozzles, as previously described herein. The movable object may have one or more, two or more, three or more, or four or more propulsion mechanisms. The propulsion mechanisms may all be of the same type. Alternatively, one or more propulsion mechanisms can be different types of propulsion mechanisms. In some embodiments, the propulsion mechanisms 3106 can enable the movable object 3100 to take off vertically from a surface or land vertically on a surface without requiring any horizontal movement of the movable object 3100 (e.g., without traveling down a runway). Optionally, the propulsion mechanisms 3106 can be operable to permit the movable object 3100 to hover in the air at a specified position and/or orientation.

For example, the movable object 3100 can have multiple horizontally oriented rotors that can provide lift and/or thrust to the movable object. The multiple horizontally oriented rotors can be actuated to provide vertical takeoff, vertical landing, and hovering capabilities to the movable object 3100. In some embodiments, one or more of the horizontally oriented rotors may spin in a clockwise direction, while one or more of the horizontally rotors may spin in a counter-clockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 3100 (e.g., with respect to up to three degrees of translation and up to three degrees of rotation).

The sensing system 3108 can include one or more sensors that may sense the spatial disposition, velocity, and/or acceleration of the movable object 3100 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 3108 can be used to control the spatial disposition, velocity, and/or orientation of the movable object 3100 (e.g., using a suitable processing unit and/or control module, as described below). Alternatively, the sensing system 3108 can be used to provide data regarding the environment surrounding the movable object, such as weather conditions, proximity to potential obstacles, location of geographical features, location of manmade structures, and the like.

The communication system 3110 enables communication with terminal 3112 having a communication system 3114 via wireless signals 3116. In some embodiments, the terminal may include an RPD module as described elsewhere herein. The communication systems 3110, 3114 may include any number of transmitters, receivers, and/or transceivers suitable for wireless communication. The communication may be one-way communication, such that data can be transmitted in only one direction. For example, one-way communication may involve only the movable object 3100 transmitting data to the terminal 3112, or vice-versa. The data may be transmitted from one or more transmitters of the communication system 3110 to one or more receivers of the communication system 3112, or vice-versa. Alternatively, the communication may be two-way communication, such that data can be transmitted in both directions between the movable object 3100 and the terminal 3112. The two-way communication can involve transmitting data from one or more transmitters of the communication system 3110 to one or more receivers of the communication system 3114, and vice-versa.

In some embodiments, the terminal 3112 can provide control data to one or more of the movable object 3100, carrier 3102, and payload 3104 and receive information from one or more of the movable object 3100, carrier 3102, and payload 3104 (e.g., position and/or motion information of the movable object, carrier or payload; data sensed by the payload such as image data captured by a payload camera). In some embodiments, the movable object 3100 can be configured to communicate with another remote device in addition to the terminal 3112, or instead of the terminal 3112. The terminal 3112 may also be configured to communicate with another remote device as well as the movable object 3100. For example, the movable object 3100 and/or terminal 3112 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 3100, receive data from the movable object 3100, transmit data to the terminal 3112, and/or receive data from the terminal 3112. Optionally, the remote device can be connected to the Internet or other telecommunications network, such that data received from the movable object 3100 and/or terminal 3112 can be uploaded to a website or server.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A positioning system comprising:
a plurality of base stations distributed at a plurality of locations, each base station configured to:
receive an estimated location of the base station at a receiver coupled to the base station; and
determine a correction measurement based on the estimated location of the base station and a known location of the base station; and
a tracking device configured to:
obtain estimated locations of a plurality of target objects;
receive an estimated location of the tracking device at a receiver coupled to the tracking device;
determine an adjusted correction measurement based on the correction measurements determined by two or more of plurality of base stations and two or more weighting coefficients, the weighting coefficients being determined based on proximities between the tracking device and the two or more base stations and signal integrity of the correction measurements of the two or more base stations;
determine relative positions between the plurality of target objects and the tracking device based on the estimated locations of the target objects, the estimated location of the tracking device, and the adjusted correction measurement; and control a movement of the tracking device according to the relative positions;
wherein obtaining the estimated locations of the plurality of target objects includes:
in response to an obstacle blocking signal communication between the tracking device and one of the plurality of target objects, receiving the estimated location of the one of the plurality of target objects from another one of the plurality of target objects.

2. The system of claim 1, wherein the tracking device is located on an unmanned aerial vehicle (UAV) and associated with one or more actuators that are configured to effect movement of the vehicle or the tracking device relative to the vehicle.

3. The system of claim 1, wherein:
the receiver coupled to the tracking device includes a first global navigation satellite system (GNSS) receiver, and the estimated location of the tracking device is determined based on GNSS signals received at the first GNSS receiver, and
the receiver coupled to the base station includes a second GNSS receiver, and the estimated location of the base station is determined based on GNSS signals received at the second GNSS receiver.

4. The system of claim 1, wherein the plurality of base stations are stationary.

5. The system of claim 1, wherein the plurality of base stations are movable.

6. The system of claim 1, wherein the correction measurement includes a difference between the estimated location of the base station and the known location of the base station.

7. The system of claim 6, wherein the correction measurement is based on a differential global navigation satellite system (GNSS) technique.

8. The system of claim 7, wherein the correction measurement is made according to GNSS carrier phase measurements and/or pseudorange measurements of GNSS signals received at the receiver coupled to the base station.

9. The system of claim 8, wherein the correction measurement is made by performing real-time kinematic (RTK) calculations on the GNSS carrier phase measurements and/or the pseudorange measurements.

10. The system of claim 7, wherein the correction measurement is included in a real-time kinematic (RTK) correction signal.

11. A tracking apparatus comprising one or more processors that are, individually or collectively, configured to:
obtain estimated locations of a plurality of target objects;
obtain an estimated location of a tracking device;
for each of a plurality of base stations distributed at a plurality of locations, obtain an estimated location of the base station and a known location of the base station, and determine a correction measurement based on the estimated location of the base station and the known location of the base station;
determine an adjusted correction measurement based on the correction measurements determined by two or more of plurality of base stations and two or more weighting coefficients, the weighting coefficients being determined based on proximities between the tracking device and the two or more base stations and signal integrity of the correction measurements of the two or more base stations; and
determine relative positions between the plurality of target objects and the tracking device based on the estimated locations of the target objects, the estimated location of the tracking device, and the adjusted correction measurement;

wherein obtaining the estimated locations of the plurality of target objects includes:
in response to an obstacle blocking signal communication between the tracking device and one of the plurality of target objects, receiving the estimated location of the one of the plurality of target objects from another one of the plurality of target objects.

12. A tracking method comprising:
obtaining estimated locations of a plurality of target objects;
obtaining an estimated location of a tracking device;
for each of a plurality of base stations distributed at a plurality of locations, obtaining a correction measurement determined based on an estimated location of the base station and a known location of the base station;
determining an adjusted correction measurement based on the correction measurements determined by two or more of plurality of base stations and two or more weighting coefficients, the weighting coefficients being determined based on proximities between the tracking device and the two or more base stations and signal integrity of the correction measurements of the two or more base stations; and
determining relative positions between the plurality of target objects and the tracking device based on the estimated locations of the target objects, the estimated location of the tracking device, and the adjusted correction measurement;
wherein obtaining the estimated locations of the plurality of target objects includes:
in response to an obstacle blocking signal communication between the tracking device and one of the plurality of target objects, receiving the estimated location of the one of the plurality of target objects from another one of the plurality of target objects.

13. The method of claim 12, wherein the tracking device is located on an unmanned aerial vehicle (UAV).

14. The method of claim 12, wherein:
the estimated locations of the target objects are determined based on global navigation satellite system (GNSS) signals received at the target objects,
the estimated location of the tracking device is determined based on GNSS signals received at the mobile tracking device, and
the estimated location of the base station is determined based on GNSS signals received at the base station.

15. The method of claim 12, wherein the known location of the base station includes an accurately surveyed location having a set of known global spatial coordinates.

16. The method of claim 12, wherein determining the correction measurement includes determining a difference between the estimated location of the base station and the known location of the base station as the correction measurement.

17. The method of claim 12, further comprising:
achieving a positional goal based on the relative positions between the plurality of target objects and the tracking device.

18. The method of claim 17, wherein the positional goal includes at least one of:
maintaining predetermined distances between the tracking device and the plurality of target objects,
maintaining predetermined attitudes of the tracking device relative to the plurality of target objects, or
substantially positioning the plurality of target objects in a target region of an image frame captured using an imaging device coupled with the tracking device.

19. The method of claim 12,
wherein the tracking device is one of a plurality of tracking devices,
the method further comprising:
determining positions of the plurality of tracking devices relative to one another based on estimated locations of the tracking devices and the adjusted correction measurement corresponding to each tracking device; and
controlling the plurality of tracking devices to perform at least one of:
moving in a predetermined formation relative to one another, or
moving in a predetermined formation relative to the plurality of target objects.

20. The method of claim 12,
wherein the tracking device is one of a plurality of tracking devices,
the method further comprising:
determining positions of the plurality of tracking devices relative to one another based on estimated locations of the tracking devices and the correction measurement corresponding to each tracking device; and
controlling the plurality of tracking devices to perform at least one of:
following a plurality of predetermined trajectories, or
following a plurality of predetermined trajectories that are defined relative to the plurality of target objects.

* * * * *